United States Patent
Nishi et al.

[19]

[11] Patent Number: 5,952,793
[45] Date of Patent: Sep. 14, 1999

[54] DISCHARGE LAMP IGNITING APPARATUS INCLUDING FEEDBACK CONTROL

[75] Inventors: Kenichiro Nishi; Satoshi Nagai; Kentaro Eguchi; Takeshi Arai; Jun Bunya; Kazutaka Shimizu; Koji Shibata, all of Tokyo; Isamu Ogawa, Kanagawa, all of Japan

[73] Assignees: Mitsubishi Denki Kabushiki Kaisha, Chiyoda-ku; Mitsubishi Lighting Fixture Co., Ltd., Kamakura, both of Japan

[21] Appl. No.: 08/816,051

[22] Filed: Mar. 11, 1997

[30] Foreign Application Priority Data

Mar. 14, 1996 [JP] Japan .................................. 8-057736
Mar. 28, 1996 [JP] Japan .................................. 8-074024

[51] Int. Cl.$^6$ .................................................. H05B 37/02
[52] U.S. Cl. ...................... 315/307; 315/308; 315/DIG. 4
[58] Field of Search ................................... 315/224, 291, 315/307, 308, DIG. 4, DIG. 5, 312, 324

[56] References Cited

U.S. PATENT DOCUMENTS 4,870,327  9/1989  Jorgensen ................................. 315/307
5,449,981  9/1995  Auld, Jr. et al. ......................... 315/308

FOREIGN PATENT DOCUMENTS 42 33 861    4/1994   Germany .
64-3995      1/1964   Japan .
6-302393    10/1994   Japan .
2 120 870   12/1983   United Kingdom .

*Primary Examiner*—David H. Vu
*Attorney, Agent, or Firm*—Burns, Doane, Swecker & Mathis, LLP

[57] ABSTRACT

A current flowing through a discharge lamp 4 is detected by a current detecting circuit 5, and the detected current is outputted as a lamp current signal A to a feedback control circuit 7 where a difference between the lamp current signal A and the dimming control signal B is obtained and amplified, and then a simplified signal D is outputted to an adder 12 which adds the amplified signal D to the dimming control signal B to constitute a control signal E. The control signal is fed back to a high frequency power supply 2. When a comparing circuit 15 detects that the light level of the dimming control signal B with respect to the full light becomes higher than or equal to 40% to 60%, the feedback circuit is disconnected by operating a switch 13 provided between an error amplifying circuit 9 and an adder 12 to stop the feedback control.

10 Claims, 27 Drawing Sheets

DISCHARGE LAMP IGNITING APPARATUS INCLUDING FEEDBACK CONTROL

BACKGROUND OF THE INVENTION

1. Field of the Invention

The present invention relates to an igniting apparatus of a discharge lamp, and more specifically, to a discharge lamp igniting apparatus for performing a feedback control so as to control light a fluorescent lamp and the like. The present invention also relates to a discharge lamp igniting apparatus provided with a function for correctly judging a final lifetime stage of a discharge lamp.

2. Description of the Related Art

A dimming control apparatus for controlling light of a discharge lamp and the like is known in the art. To prevent either flickers or moving flanges which occur when the light level is deep (dark) and the air temperature is low, the technique related to the feedback control is known from, for example, Japanese Laid-open Patent Application No. 6-302393. FIG. 1 is a structural diagram for showing an outline of this known technique.

In this example, the power supplied from the high frequency power supply 2 to the discharge lamp 4 of the load circuit 3 is detected by the current detecting circuit 5. Based upon the lamp current signal "A" detected by this detecting circuit 5 and the externally inputted dimming control signal "B", the control signal E for controlling the high frequency supply 2 is produced by the feedback control circuit 7. The feedback control circuit 7 subtracts the lamp current signal A from the dimming control signal B, and the error signal "C" is amplified by the error amplifying circuit 9. Furthermore, the amplified signal "D" is added to the dimming control signal B to thereby produce the control signal E. FIG. 2 indicates a relationship between the dimming control signal B and the lamp current signal A under room temperature.

In this example, when the value of the lamp current signal A is the same as the dimming control signal B, the error signal C becomes "0", and also the output from the error amplifying circuit 9 becomes "0". Accordingly, the dimming control signal B is directly entered as the control signal E into the high frequency power supply 2. When the value of the lamp current signal A is lower-than the dimming control signal B, the error signal C is produced, and then is amplified by the error amplifying circuit 9. Furthermore, the amplified error signal is added to the dimming control signal B, so that the control signal E is formed, and is entered into the higher frequency power supply 2. As described above, the feedback control is carried out in response to the dimming control signal B, so that the lamp current signal A is increased so as to prevent flickers, or moving flanges of the discharge lamp 4.

In this sort of discharge lamp-igniting apparatus, since the feedback control circuit 7 into which the lamp current signal A is inputted is operated by the low voltage power supply under normal condition, when the detected lamp current signal A becomes high, the capability of the feedback control circuit 7 must be increased. However, as indicated in FIG. 14, in the above-described case, the lamp current signal A is detected which should be controlled with respect to the entire range of the dimming control signal B. Even when the light level is low (shallow) and thus the necessity of the feedback control is lowered, the feedback control becomes active.

In other words, most of the cases that the feedback control is required are such cases that the light level is deep (dark). This corresponds to only ⅓ to ⅕ of the range for detecting the lamp current signal A with respect to the overall dimming control range of the dimming control signal B. In other cases, waste feedback controls are carried out. As a consequence, in the above-described example, the lamp current signal A is carried out in a waste manner with respect to the overall dimming control range of the dimming control signal B. As a result, there are problems that the dynamic range of the actually required detecting range is relatively narrowed, and the detection precision would be decreased, and also the noise resistibility would be deteriorated.

FIG. 3 is a structural diagram for explaining another conventional discharge lamp igniting apparatus described in, for instance, Japanese Laid-open Patent Application No. 64-3995. In the drawing, reference numeral 101 indicates the commercial power supply, reference numeral 102 denotes the high frequency power supply for converting the DC power converted by the rectifying/smoothing circuit 124 into the high frequency power, and reference numeral 103 indicates the load circuit containing the discharge lamp 104. Reference numeral 105 shows the voltage detecting circuit for detecting the voltage of the discharge lamp 104, reference numeral 106 indicates the detection voltage detected by the voltage detecting circuit 105, and reference numeral 110 represents the control circuit in which the comparator 107 compares the detection voltage 106 with the first reference voltage 108a, and the control signal 112 is sent to the high frequency power supply 102.

Next, a description will be made of operations of the discharge lamp igniting apparatus with reference to FIG. 3. When the discharge lamp 104 reaches the final lifetime stage, the half wave discharge will occur in which a discharge occurs only from one electrode of the discharge lamp 104, and no discharge occurs from the other electrode thereof. When the half wave discharge occurs, since the impedance of the discharge lamp 104 is increased, a high voltage is produced from the voltage detecting circuit, as compared with that when the normal discharge occurs. The detection voltage 106 detected by the voltage detecting circuit 105 is compared with the first reference voltage 108a by the comparator 107 of the control circuit 110, and then when the detection voltage 106 is higher than the first reference voltage, the control circuit judges that the discharge lamp is in the final lifetime stage. Then, the control circuit 110 sends the control signal for interrupting, or reducing the output of the high frequency power supply 102 in order to prevent the discharge lamp igniting apparatus from being destroyed.

Now, the operation characteristic while the discharge lamp 104 is turned ON is shown in FIG. 4. The discharge lamp 104 under turn-ON state owns the negative characteristic that the discharge voltage is gradually increased in connection with the decrease of the discharge current, as shown in FIG. 4. As a consequence, since the impedance of the discharge lamp 104 in the final lifetime stage is large, the discharge current becomes low. As a result, the voltage of the discharge lamp in the final lifetime stage is higher than that under normal turn-ON state.

Since the conventional discharge lamp igniting apparatus is arranged in the above-described manner, in the discharge lamp igniting apparatus having no such a dimming control function for variably controlling the light flux emitted from the discharge lamp, either the voltage of the discharge lamp during the normal operation or the voltage of the discharge lamp during the final lifetime stage is produced from the voltage detecting circuit. As a consequence, in order to correctly judge the final lifetime stage of the discharge lamp, the first reference voltage to be set into the comparator is suitably located in the voltage region shown in FIG. 5.

However, in the discharge lamp igniting apparatus equipped with the dimming control function, as shown in the operation characteristic of FIG. 6, the voltage of the discharge lamp under normal condition is gradually increased in connection with the decrease of the light level with respect to the full light. As a result when the first reference voltage to be set to the comparator is set to, for example, a zone "A" of FIG. 6, namely, when the level of the first reference voltage is set to high, it could not correctly judge the final lifetime stage of the discharge lamp near the full light (light level: 10%). Thus, there is a risk that the discharge lamp igniting apparatus would be destroyed. Also, when the first reference voltage to be set to the comparator is set to a zone "B" of FIG. 6, namely when the level of the first reference voltage is set to low, there is a problem. That is, the discharge lamp operated under normal condition in the low dimming control range is erroneously judged as the discharge lamp operated in the final lifetime stage. As described above, it is very difficult to set the range of the first reference voltage.

SUMMARY OF THE INVENTION

The present invention has been made to solve the above-described problem, and an object of the invention is to obtain a discharge lamp igniting apparatus capable of further widening a dynamic range of an actually necessary detection range, capable of increasing detection precision, and also capable of improving noise resistibility in an apparatus for preventing a discharge lamp and the like from disappearing by executing a feedback control.

Another object of the invention is to provide a discharge lamp igniting apparatus having a dimming control function and capable of not making an erroneous judgment such that a discharge lamp operable under normal state is recognized as that of a final lifetime stage, but also of correctly judging the final lifetime stage of the discharge lamp, whereby it is possible to prevent the discharge lamp igniting apparatus from being electrically destroyed.

To this end, a discharge lamp igniting apparatus according to a first aspect of the present invention, is featured by comprising: a load circuit containing a discharge lamp; a high frequency power supply for supplying high frequency power whose frequency is higher than that of a commercial power supply to the load circuit; a current detecting circuit for detecting a lamp current flowing through the discharge lamp to thereby output a lamp current signal; a dimming control circuit for controlling the high frequency power supply to thereby output a dimming control signal used to control the light of the discharge lamp; an error amplifying circuit for amplifying an error between the lamp current signal and the dimming control signal; and an adder for adding the signal amplified by the error amplifying circuit to the dimming control signal to thereby output the added signal as a control signal to the high frequency power supply; wherein: when the dimming control signal reaches a preset value, entering of the signal amplified by the error amplifying circuit into the high frequency power supply is blocked.

Also, a discharge lamp igniting apparatus according to a second aspect of the present invention is featured by that when a light level of the dimming control signal is located within a range of the light level between approximately 40% and approximately 100%, or between approximately 60% and approximately 100% with respect to all light, entering of the signal amplified by the error amplifying circuit into the high frequency power supply is blocked.

Further, a discharge lamp igniting apparatus according to a third aspect of the present invention is featured by that plural pieces of the load circuits are provided with respect to the high frequency power supply, and plural pieces of the current detecting circuits are provided with respect to the high frequency power supply; and the lamp current signals outputted from the respective current detecting circuits are compared with each other, whereby a smaller one of the compared lamp signals is outputted to a subtracter.

Further, a discharge lamp igniting apparatus according to a fourth aspect of the present invention is featured by that plural pieces of the load circuits are provided in parallel to the high frequency power supply, and plural pieces of the current detecting circuits are provided in parallel to the high frequency power supply; and each of the load circuits and each of the current detecting circuits are provided via a balancer transformer.

Further, a discharge lamp igniting apparatus according to a fifth aspect of the present invention is featured by that a temperature detecting circuit for detecting an ambient temperature is employed; and when the temperature detected by the temperature detecting circuit is lower than, or equal to a predetermined value, the value of the lamp current signal is reduced and then the reduced lamp current signal is outputted to a subtracter.

Further, a discharge lamp igniting apparatus according to a sixth aspect of the present invention is featured by that the discharge lamp igniting apparatus includes a sequence control circuit for sequentially controlling at least turn-on/turn-off operations of the discharge lamp; and when the discharge lamp is under turn-off state, the sequence control circuit blocks entering of the control signal into the high frequency power supply.

Further, a discharge lamp igniting apparatus according to a seventh aspect of the present invention is featured by that when the discharge lamp is under turn-off state, the sequence control circuit replaces the control signal by a sequence control signal corresponding to the turn-off state and inputs the sequence control signal into the high frequency power supply.

Further, a discharge lamp igniting apparatus according to an eighth aspect of the present invention is featured by that when the dimming control signal reaches a preset value, the error amplifying circuit sets the output signal thereof to 0.

Further, a discharge lamp igniting apparatus according to a ninth aspect of the present invention is featured by that the error amplifying circuit is such a variable error amplifying circuit that when the light level of the dimming control signal becomes deeper, a feedback control gain is increased, whereas when the light level of the dimming control signal becomes shallower, the feedback control gain is decreased.

Further, a discharge lamp igniting apparatus according to a tenth aspect of the present invention is featured by that the discharge lamp igniting apparatus includes a limiting circuit for limiting the magnitude of the feedback control gain from becoming larger than, or equal to a predetermined value.

Further, a discharge lamp igniting apparatus according to an eleventh aspect of the invention is featured by such a discharge lamp igniting apparatus arranged by a discharge lamp, and a high frequency power supply for supplying high frequency power to this discharge lamp, for controlling an output of this high frequency power supply to control light of the discharge lamp, comprising: voltage detecting means for detecting a voltage of the discharge lamp; voltage changing means for changing either the voltage of the discharge lamp detected by this voltage detecting means or a reference voltage in response to a light level of the discharge lamp; comparing means for comparing the reference voltage with the voltage of the discharge lamp changed by this voltage changing means; and control means for interrupting, or reducing the output of the high frequency power supply when the voltage of the discharge lamp becomes high.

Further, a discharge lamp igniting apparatus according to a twelfth invention is featured by that the control means in the eleventh aspect of the invention includes two-stage switching means for switching a first reference voltage and a second reference voltage when the light level of the discharge lamp is lower than, or equal to a predetermined value; the comparing means compares the voltage of the discharge lamp with the first reference voltage, or the voltage of the discharge lamp with the second reference voltage; and when the voltage of the discharge lamp becomes high, the output of the high frequency power supply is interrupted, or reduced.

Further, a discharge lamp igniting apparatus according to a thirteenth aspect of the invention is featured by that the control means in the eleventh aspect of invention includes hysteresis means for establishing a hysteresis characteristic at a point where when the light level of the discharge lamp is smaller than, or equal to a predetermined value, the first reference voltage is switched into the second reference voltage by the two-stage switching means, and at another point where the second reference voltage is switched into the first reference voltage by the two-stage switching means; the comparing means compares the voltage of the discharge lamp with the first reference voltage, or the voltage of the discharge lamp with the second reference voltage; and when the voltage of the discharge lamp becomes high, the output of the high frequency power supply is interrupted, or reduced.

Further, a discharge lamp igniting apparatus according to a fourteenth aspect of the invention is featured by that the control means in the eleventh aspect of the invention includes hysteresis means for establishing a hysteresis characteristic at a point where when the light level of the discharge lamp is smaller than, or equal to a predetermined value, plural-stage switching means switches the voltage from the first reference voltage into the second reference voltage and further from the second reference voltage into a third reference voltage; and at another point where the plural-stage switching means switches the voltage from the third reference voltage to the second reference voltage and further from the second reference voltage to the first reference voltage; and the comparing means compares the voltage of the discharge lamp with the first reference voltage, or the voltage of the discharge lamp with the second reference voltage, or the voltage of the discharge lamp with the third reference voltage; and when the voltage of the discharge lamp becomes high, the output of the high frequency power supply is interrupted, or reduced.

Further, a discharge lamp igniting apparatus according to a fifteenth aspect of the invention is featured by that the control means in the eleventh aspect of the invention includes voltage amplifying means for gradually amplifying the reference voltage in connection with the decrease of the light level of the discharge lamp; the comparing means compares the voltage of the discharge lamp with the voltage amplified by the voltage amplifying means; and the output of the high frequency power supply is interrupted, or reduced.

Further, a discharge lamp igniting apparatus according to a sixteenth aspect of the invention is featured by that the control means in the eleventh aspect of the invention includes voltage dividing means for dividing the voltage of the discharge lamp when the light level of the discharge lamp is smaller than, or equal to a predetermined value; the comparing means compares the voltage of the discharge lamp with the reference voltage, or the voltage divided by the voltage dividing means with the reference voltage; and when the voltage of the discharge lamp, or the voltage divided by the voltage dividing means becomes high, the output of the high frequency power supply is interrupted, or reduced.

Further, a discharge lamp igniting apparatus according to a seventeenth aspect of the invention is featured by that the voltage control means in the eleventh aspect of the invention includes voltage attenuating means for gradually attenuating the voltage of the discharge lamp in connection with the decrease of the light level of the discharge lamp; the comparing means compares the reference voltage with the voltage attenuated by the voltage attenuating means; and when the voltage attenuated by the voltage attenuating means become high, the output of the high frequency power supply is interrupted, or reduced.

Further, a discharge lamp igniting apparatus according to an eighteenth aspect of the invention is featured by that the control means in the eleventh aspect of the invention causes the comparing means to compare the voltage of the discharge lamp with the reference voltage when the light level of the discharge lamp is larger than, or equal to a predetermined value, and either interrupts or reduces the output of the high frequency power supply when the voltage of the discharge lamp becomes high.

The above and other objects and features of the present invention will be more apparent from the following description taken in conjunction with the accompanying drawings.

DETAILED DESCRIPTION OF THE PREFERRED EMBODIMENTS

Figure 1:
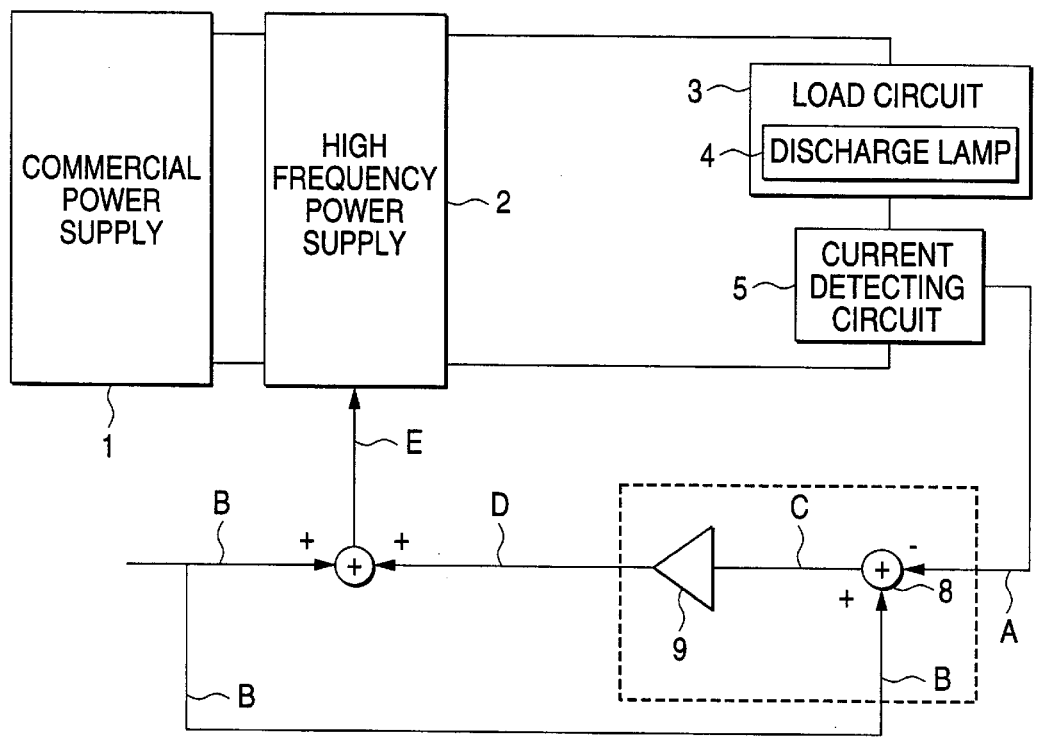
FIG. 1 is a structural diagram of a conventional apparatus.
Figure 2:
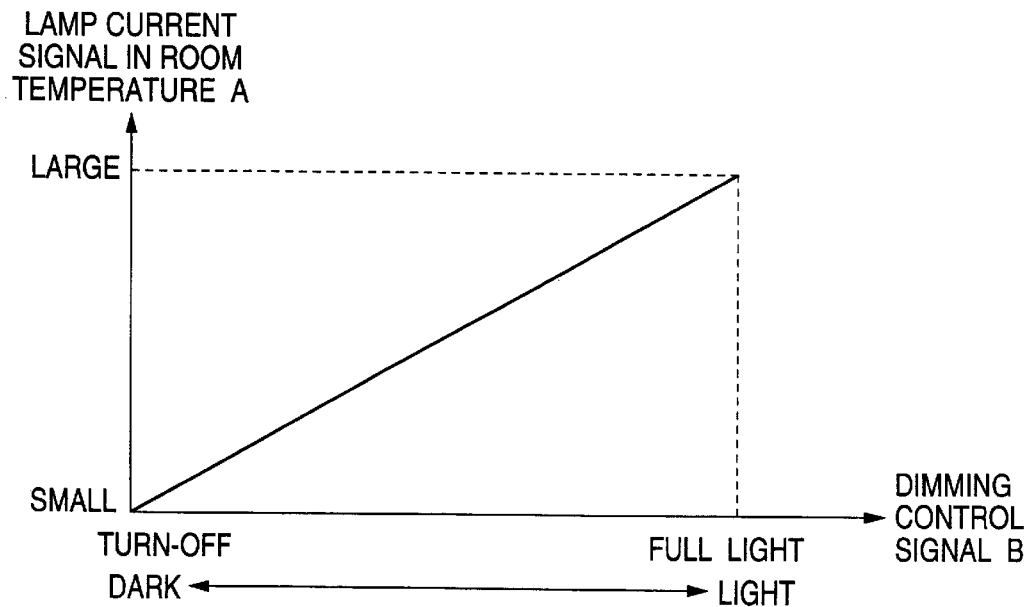
FIG. 2 is a diagram for explaining operation of the conventional apparatus.
Figure 3:
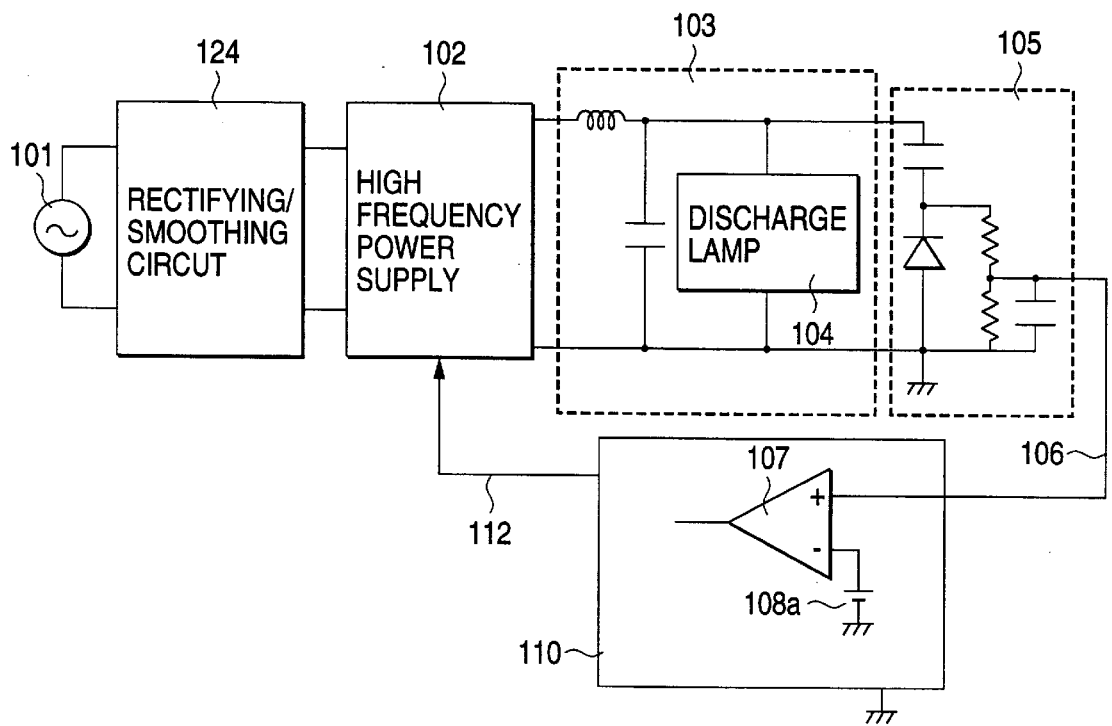
FIG. 3 is a structural diagram for describing another conventional discharge lamp igniting apparatus.
Figure 4:
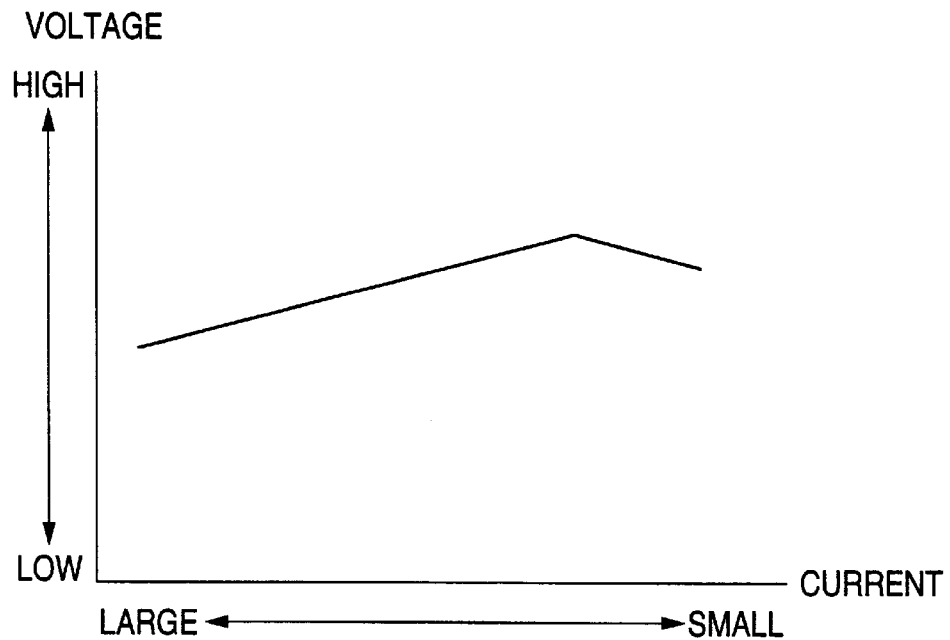
FIG. 4 is an example of an operation characteristic of a discharge lamp.
Figure 5:
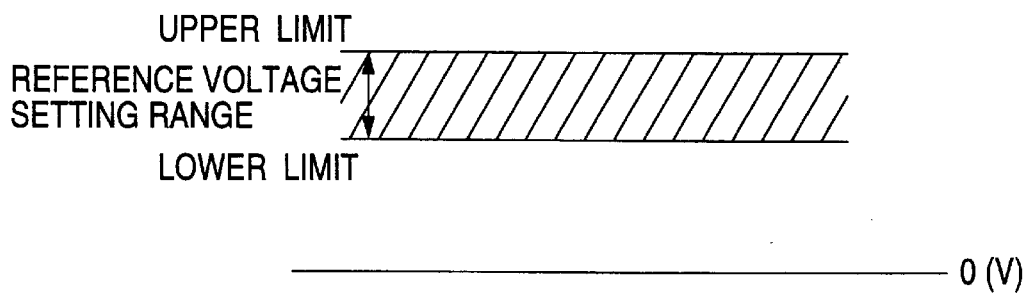
FIG. 5 is an example of the reference voltage setting range of the conventional discharge lamp igniting apparatus.
Figure 6:
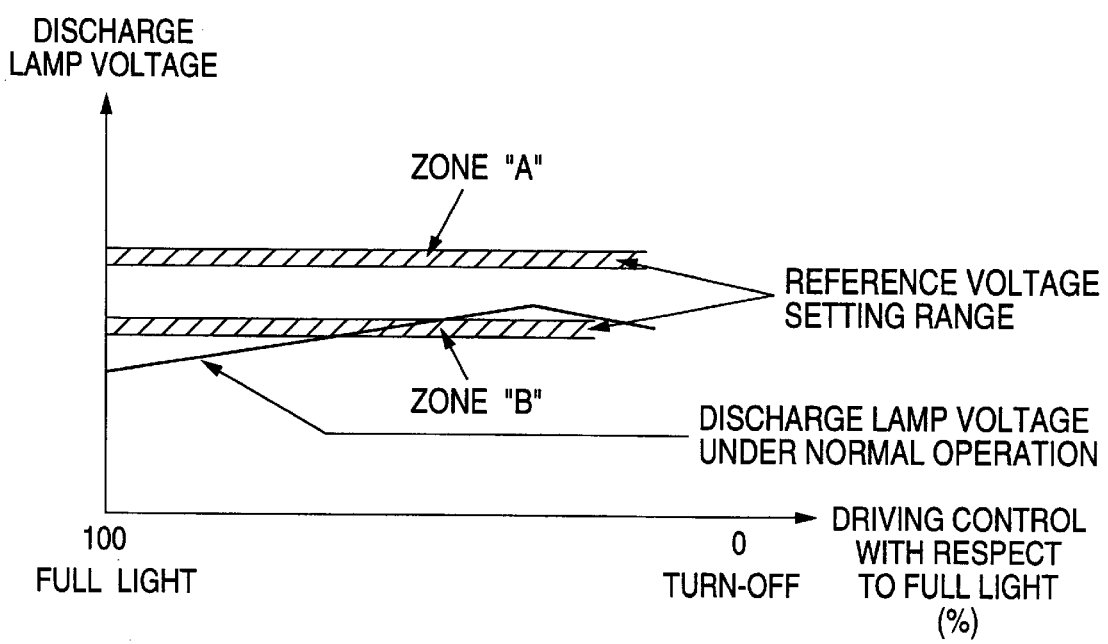
FIG. 6 is an example of the conventional operation characteristic.

Now, a description will be described in more detail of preferred embodiments of the present invention with reference to the accompanying drawings.

It should be noted that the same reference numerals are employed as those for indicating the same or similar circuit elements.
(First Embodiment)

Figure 7:
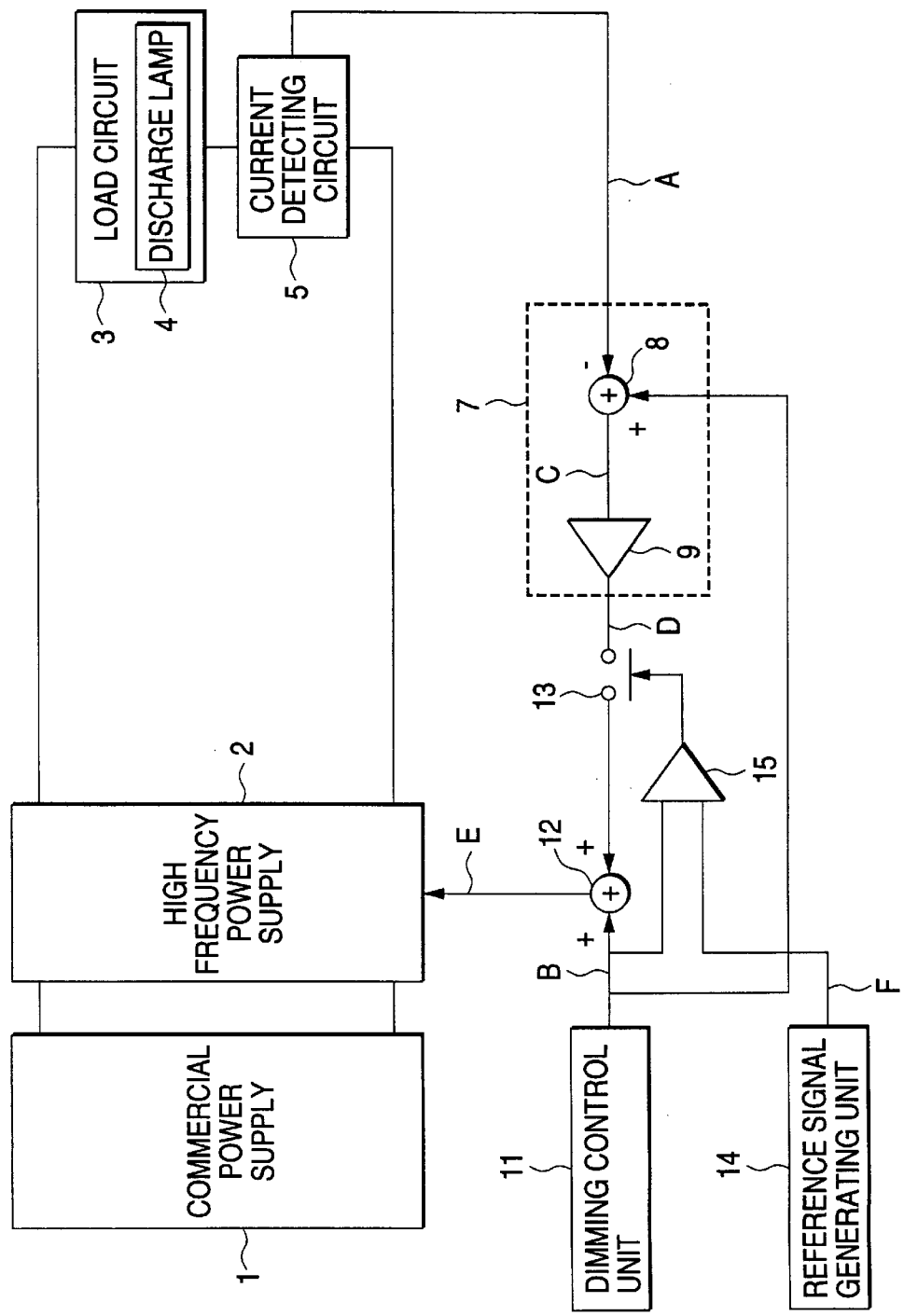
FIG. 7 is a structural diagram according to a first embodiment of the present invention.

FIG. 7 is a structural diagram of an igniting apparatus of a display lamp according to a first embodiment. Reference numeral 1 indicates a commercial power supply, and reference numeral 2 shows a high frequency power supply connected to the commercial power supply 1, for supplying high frequency power to a load circuit 3 containing a discharge lamp 4. The high frequency power supply 2 is composed of a general VCO (voltage-controlled oscillator) and a general switching element and the like. Reference numeral 5 shows a current detecting circuit for detecting a lamp current flowing through the discharge lamp 4, and symbol "A" indicates a lamp current signal detected/outputted by the current detecting circuit 5.

Reference numeral 7 is a feedback control circuit including a subtracter 8 and an error amplifying circuit 9, known in the field. The subtracter 8 subtracts the lamp current signal A from the dimming control signal B to obtain an error signal C which will be outputted to the error amplifying circuit 9. The dimming control signal B is outputted as a predetermined voltage from a dimming control circuit 11 containing light intensity varying means such as a control dial for controlling a light level. The error amplifying circuit 9 is composed of an operational amplifier which receives the error signal C, and also amplifies this error signal C which will be outputted. Reference numeral 13 denotes a switch having connection/disconnection functions, and connected between the feedback control circuit 7 and the high frequency power supply 2. Precisely speaking, this switch 13 is connected between the adder 12 and the error amplifying circuit 9. The connection/disconnection operations of the switch 13 are carried out by a comparing circuit 15 such as a comparator for comparing the dimming control signal B with a value of an operation switching light level signal F outputted from a reference signal generating unit 14.

Figure 8:
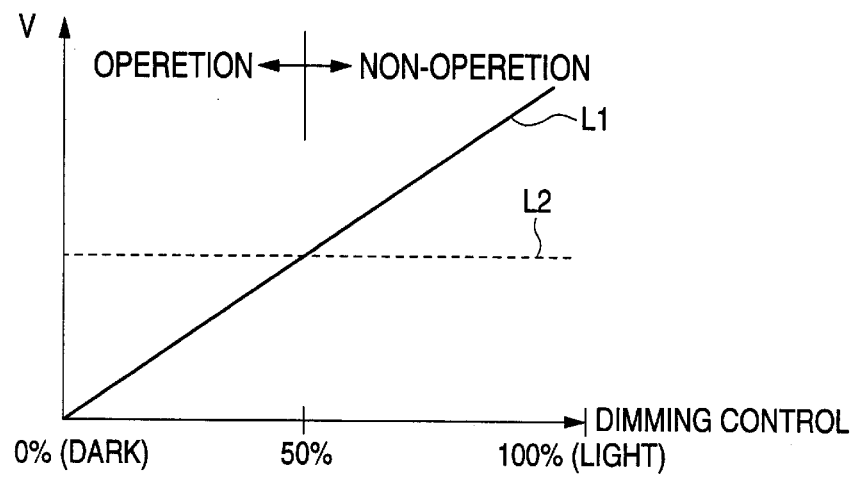
FIG. 8 is a diagram for explaining operation/non-operation of a feedback control according to the first embodiment of the present invention.

The operation switching light level signal F outputted to the comparing circuit 15 corresponds to a signal for constituting a reference value used to determine whether the feedback control is started, or stopped in a certain light level. The comparator 15 is actuated by judging as to whether or not the value of this operation switching light level signal F is larger than the dimming control signal B. FIG. 8 in this embodiment represents such a case that when the light level of the discharge lamp 4 is present in a range between 0% (namely, light of discharge lamp is controlled to be the darkest condition) and 50% (namely, medium light condition), the feedback control is started. In this graphic representation, the feedback control is set in such a manner that a cross point between an "L1" indicative of the dimming control signal B and an "L2" indicative of the operation switching light level signal F is set at 50% of the light level.

Figure 9:
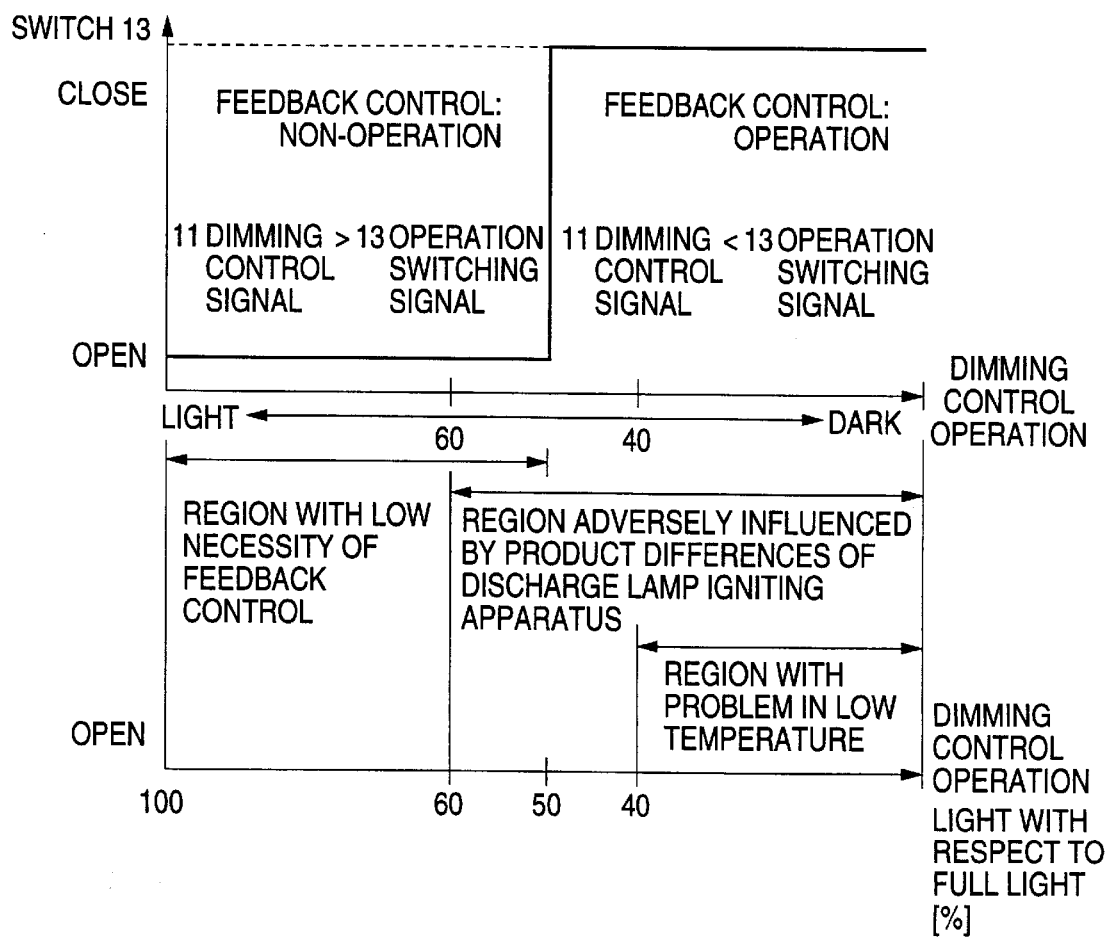
FIG. 9 is a diagram for explaining operation/non-operation of a feedback control according to the first embodiment of the present invention.

It is preferable that the value of this operation switching light level signal F is set within a range between approximately 40% and approximately 60% of the light level of the dimming control signal B. An upper portion of FIG. 9 indicates operation/non-operation of the feedback control for the dimming control signal B, and a lower portion of FIG. 9 represents a diagram for explaining characteristic matters related to the dimming control operation. As shown in FIG. 9, when the light level is below approximately 40%, there are some problems that the discharge lamp disappears and/or is flickered under low temperature conditions. When the light level is below approximately 60%, it could be understood that there are product differences (for instance, product differences of constructive components) occurred when the discharge lamp igniting apparatuses are manufactured, and when the light level is about 50%, necessities of the feedback control become low. As a consequence, the highest effects can be achieved by stopping the feedback control when the light level is set between approximately 40% and approximately 60%. This is because it is preferable to widen the range where the unnecessary feedback control is omitted, and further to sufficiently prevent flickers of the discharge lamp.

In accordance with the first embodiment, when the value of the dimming control signal B reaches a preset value (when dimming control signal becomes higher than, or equal to 50% for full light in this embodiment), the switch 13 is brought into the disconnection condition, so that the feedback control is stopped. Accordingly, the lamp current signal A may be detected only within the limited range (light levels from 0% to 50%) from the current detecting circuit 5, so that there is no need to detect also such a lamp current signal A unnecessary to the feedback control. Furthermore, the current detection range is narrowed so as to relatively widen the dynamic range. Therefore, the detection precision of the lamp current signal can be increased, and also the noise resistibility can be improved.

In such a case that the dimming control signal B becomes higher than, or equal to approximately 40% to approximately 60% for full light, the feedback control is stopped. As a result, it is possible to prevent the flickers of the discharge lamp when the light level is low (dark) under low temperature. While preventing the adverse influences caused by the product differences among the discharge lamp igniting apparatuses, the range for detecting the lamp current signal A is narrowed, so that the dynamic range is relatively widened, and the detection of the lamp current signal can be more precise.

(Second Embodiment)

In a second embodiment, the discharge lamp 4 is connected in parallel with the high frequency power supply 2 in the first embodiment.

Figure 10:
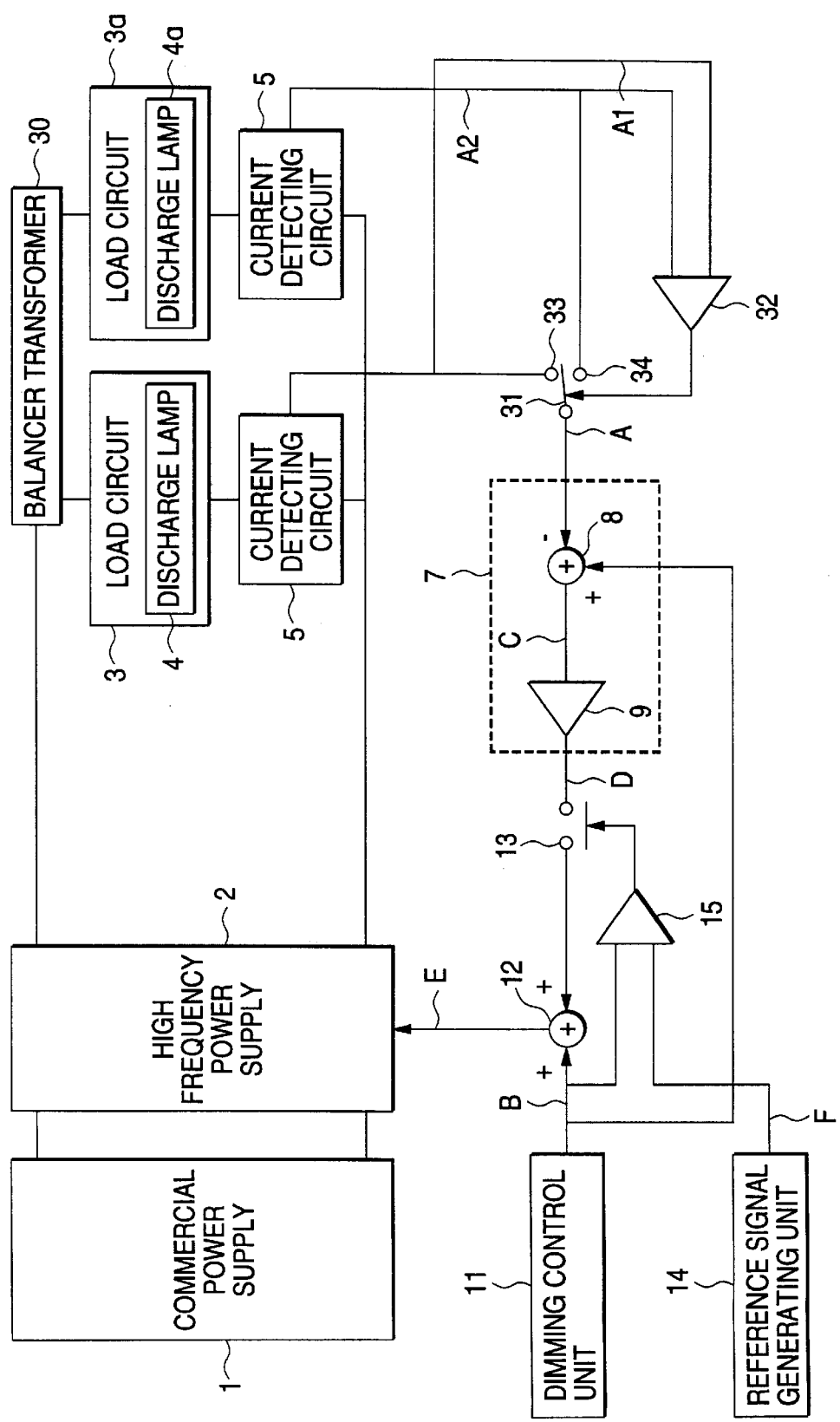
FIG. 10 is a structural diagram according to a second embodiment of the present invention.

That is, FIG. 10 is a structural diagram for showing this embodiment. A series circuit defined by the load circuit 3—the discharge lamp 4—the current detecting circuit 5, and another series circuit defined by a load circuit 3a—a discharge lamp 4a—a current detecting circuit 5a are connected through a balancer transformer 30 in parallel to the high frequency power supply 2. Other remaining circuit constructions of the second embodiment are similar to those of the first embodiment. The balancer transformer 30 is a two-winding transformer having the same magnetic path and the same coil turns. When the same currents will flow the respective windings, no magnetic flux is produced and thus the balancer transformer itself is not actuated. To the contrary, when there is a difference between the currents flowing through the respective windings, a magnetic flux corresponding to the current difference is produced, and thus a voltage is generated from the respective windings along one direction. As a consequence, the balancer transformer 30 is operated in such a manner that the currents flowing through the respective windings become identical to each other, and the currents derived from the high frequency power supply 2 are equally distributed to the respective load circuits 3 and 3a. As a consequence, the equal currents may flow through the respective series circuits.

A switching circuit 31 is connected between the respective current detecting circuits 5, 5a and the subtracter 8. This switching circuit 31 selectively switches a connection (contact 33) between the current detecting circuit 5 and the subtracter 8, and another connection (contact 34) between the current detecting circuit 5a and the subtracter 8 in response to the output derived from the comparator 32. The comparator 32 compares a lamp current signal A1 flowing through the current detecting circuit 5 with another lamp current signal A2 flowing through the current detecting circuit 5a in order that the smaller one of these lamp current signals A1 and A2 is entered into the subtracter 8. For instance, in the case that the lamp current signal A1 is smaller than the lamp current signal A2, the comparator 31 outputs a positive logic signal, whereas in the case that the lamp current signal A1 is larger than the lamp current signal A2, the comparator 31 outputs a negative logic signal. When the comparator circuit 32 outputs the positive logic signal, the switching circuit 31 is switched to the current detecting circuit 5 (contact 33), so that the lamp current signal A1 is entered into the subtracter 8. When the comparator circuit 32 outputs the negative logic signal, the switching circuit 31 is switched to the current detecting circuit 5a (contact 34), so that the lamp current signal A2 is inputted into the subtracter 8.

According to this embodiment 2, the current detecting circuit is connected to the side of the small lamp current signal by the comparing circuit 32 and the switching circuit 31 so as to select the discharge lamp side which easily disappears, or is readily flickered. Then, the logic signal is outputted to the feedback control circuit 7. Accordingly, the discharge lamp side which easily disappears is selected as the base for the feedback control. Therefore, the embodiment 2 can effectively prevent more than two discharge lamps from disappearing, or being flickered.

Also, since the discharge lamps 4 and 4a are connected through the balancer transformer 30 in parallel to the high frequency power supply 2, not only the brightness of the respective discharge lamps can be made uniform, but also the brightness of the respective discharge lamps can be made substantially uniform even when the feedback control is carried out by detecting the current flowing through one discharge lamp. In particular, when the light level is low (dark), the brightness is easily fluctuated due to the product differences in the discharge lamps. However, this embodiment can prevent this brightness fluctuation.

(Third Embodiment)

A third embodiment is arranged by that a dimming control apparatus additionally with an arrangement capable of accepting variations in temperature conditions is employed in combination with those of the first embodiment mode.

Figure 11:
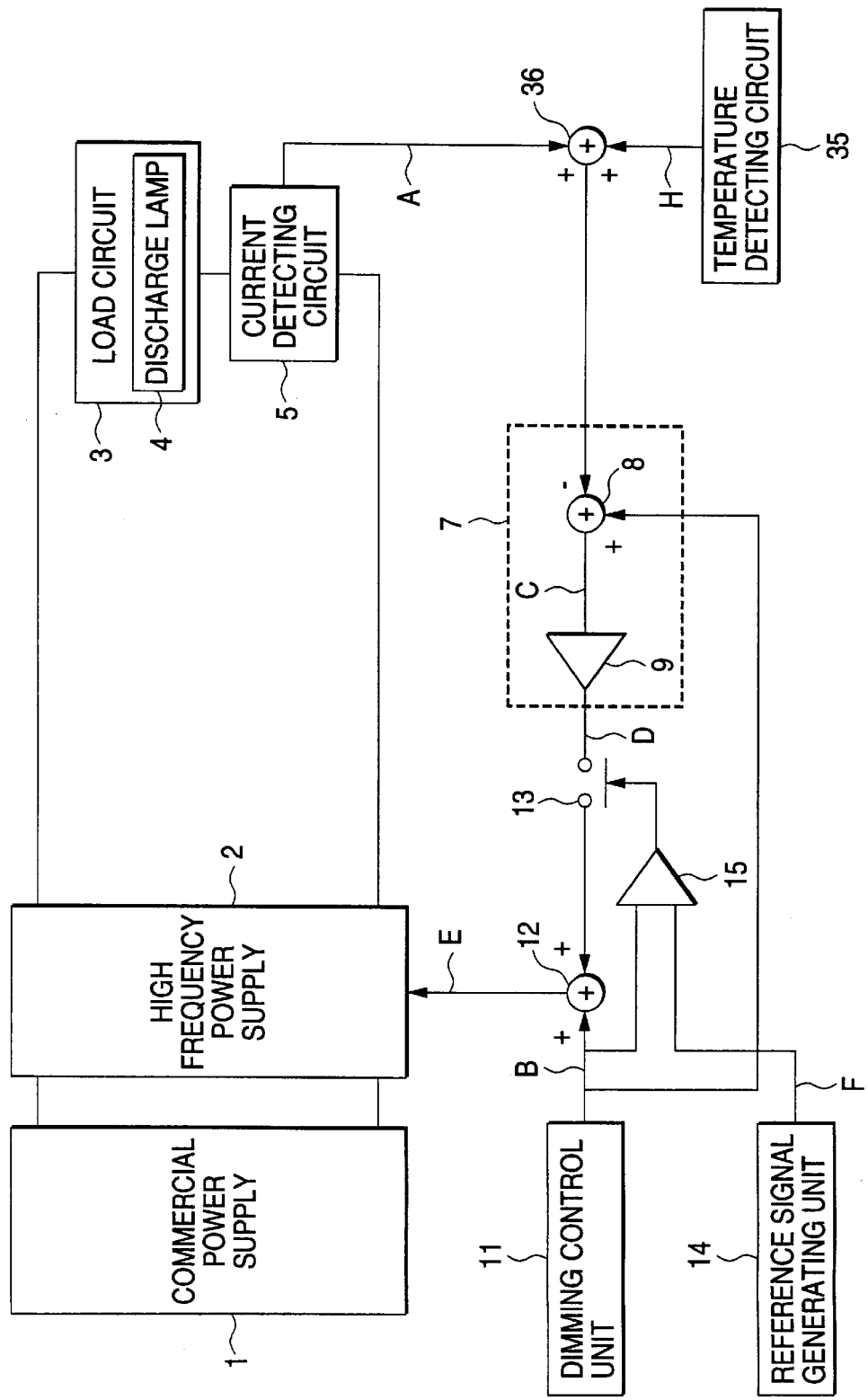
FIG. 11 is a structural diagram according to a third embodiment of the present invention.
Figure 12:
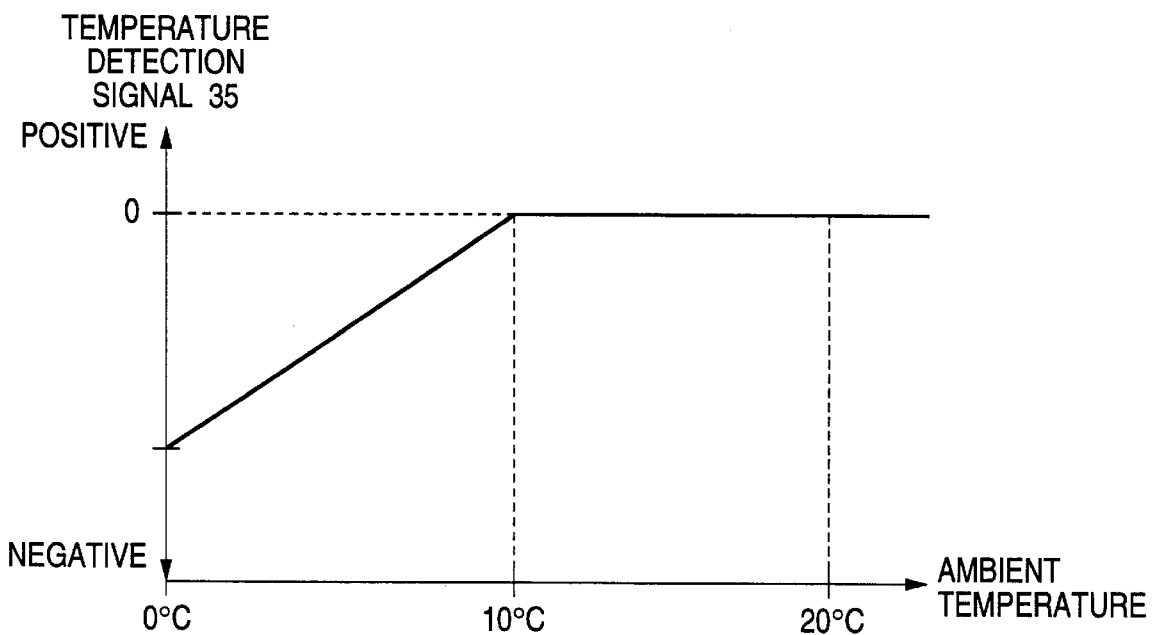
FIG. 12 is a diagram for explaining operation of a temperature detecting circuit according to the the third embodiment of the present invention.

FIG. 11 is a structural diagram for representing a discharge lamp dimming control apparatus according to this embodiment 3. This arrangement owns a different point from that of FIG. 7, namely a formation of a lamp current signal. That is, reference numeral 35 shows a general-purpose temperature detecting circuit. For instance, when an ambient temperature (room temperature) becomes higher than, or equal to 10° C., this temperature detecting circuit outputs 0, and when the ambient temperature becomes below 10° C., the temperature detecting circuit produces a negative temperature detection signal "H" to be outputted to a second adder 36 (see FIG. 12). The second adder 36 is connected between the current detecting circuit 5 and the subtracter 8, and adds the lamp current signal A outputted from the current detecting circuit 5 to the temperature detection signal H, and then outputs the added signal to the adder 8. Other circuit arrangements of this embodiment 3 are the same as those of the embodiment 1.

In the case that the ambient temperature becomes below 10° C., since the temperature detecting signal H outputted from the temperature detecting circuit 35 is negative, the signal which has been added by the second adder 36 to be inputted into the feedback control circuit 7 has a smaller value than the actually detected lamp current signal A. Since the same feedback control as in the embodiment 1 is carried out with respect to this smaller value, as compared with the actually detected lamp current signal A, a control signal E compensated by this feedback control becomes large. As a result, when the feedback control is performed under low temperature, lowering of the light output of the discharge lamp 4 can be greatly compensated. Therefore, since such a large light output compensation is made under low temperatures when the discharge lamp easily disappears, or is readily flickered, it is possible to obtain the light output similar to that obtained under room temperature. It should be understood that the temperature under which the temperature detecting circuit 35 outputs the negative temperature detection signal may be properly determined, and therefore, is not limited to 10° C. Also, the magnitude of the negative temperature detection signal outputted from the temperature detecting circuit 35 may be properly set by considering the power consumption of the discharge lamp.

(Fourth Embodiment)

Figure 13:
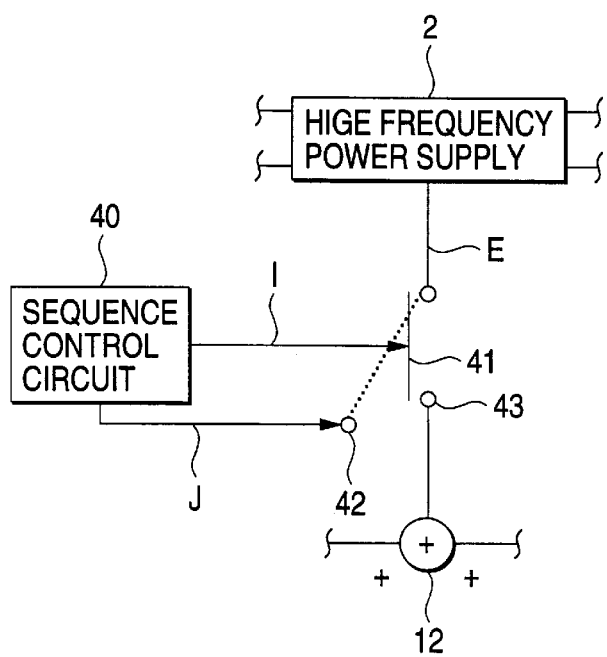
FIG. 13 is a partial structural diagram according to a fourth embodiment of the present invention.

A fourth embodiment relates to a discharge lamp igniting apparatus capable of preventing an erroneous operation of a feedback control in the first embodiment. FIG. 13 shows a partial circuit arrangement connected between the high frequency power supply 2 and the second adder 12. Since other circuit arrangements are identical to those of FIG. 7, they are omitted.

Figure 14:
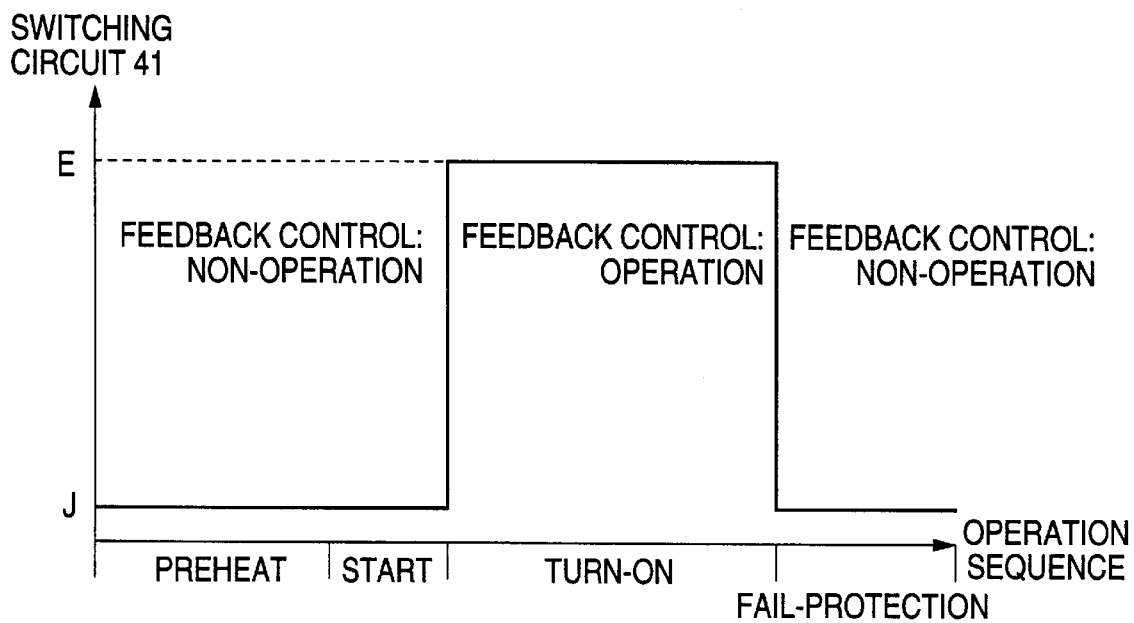
FIG. 14 is a diagram for explaining a sequence of a sequence control circuit according to the fourth embodiment of the present invention.

In this drawing, reference numeral 40 is a sequence control circuit for switching sequential operations of preheating, starting, igniting, and fail-protecting of the discharge lamp 4. For instance, the sequence control circuit 40 outputs a positive logic signal as a sequence control signal "I" to a switching circuit 41 during a time period while the discharge lamp 4 is ignited (turned ON) and outputs a negative logic signal as a preheat/start/fail-protect signal "J" to the switching circuit 41 during a preheating period, a starting period, and a fail-protecting period while the discharge lamp 4 is turned OFF. The switching circuit 41 switches a contact 42 and a contact 43 in response to a change in the logic signals. When the positive logic signal is received, the switching circuit 41 is connected to the contact 43, whereas when the negative logic signal is received, the switching circuit is connected to the contact 42. This sequence operation is shown in FIG. 14.

As a result, in the case that the sequence control circuit 40 turns ON the discharge lamp 4 and outputs the sequence control signal I to the switching circuit 41, the control signal E is outputted to the high frequency power supply 2. In such a case that the discharge circuit 4 is not turned ON as during the filament preheating period, the starting period, and the fail-protecting period, the sequence control circuit 40 controls the switching circuit 41 to be connected to the contact 42, and also outputs the preheat/start/fail-protection signal J as the control signal E to the high frequency power supply 2. As a consequence, when the discharge lamp 4 is not turned ON, the control signal used to execute the feedback control is not entered into the high frequency power supply 2, so that it is possible to prevent the erroneous operation by receiving this control signal E.

When the discharge lamp 4 is turned OFF, since the lamp current signal A is not inputted into the feedback control circuit 7, there is a large value difference in the control signal E under stable turn-ON condition and the control signal E under turn-OFF condition. Under turn-OFF state, the preheat/start/fail-protection signal J is outputted as the sequence control signal corresponding to the turn-OFF state to the high frequency power supply 2 instead of the control signal E. As a consequence, the value change between the signals inputted into the high frequency power supply 2 under both turn-ON state and turn-OFF state is essentially made small. It is possible to prevent the discharge lamp from being rapidly emitted during turn-ON operation.

(Fifth Embodiment)

It should be noted that although the operation/non-operation of the feedback control is controlled by the switch is controlled by the switch 13 in the first embodiment, the operation/non-operation of the feedback control is controlled by employing another means in this embodiment.

Figure 15:
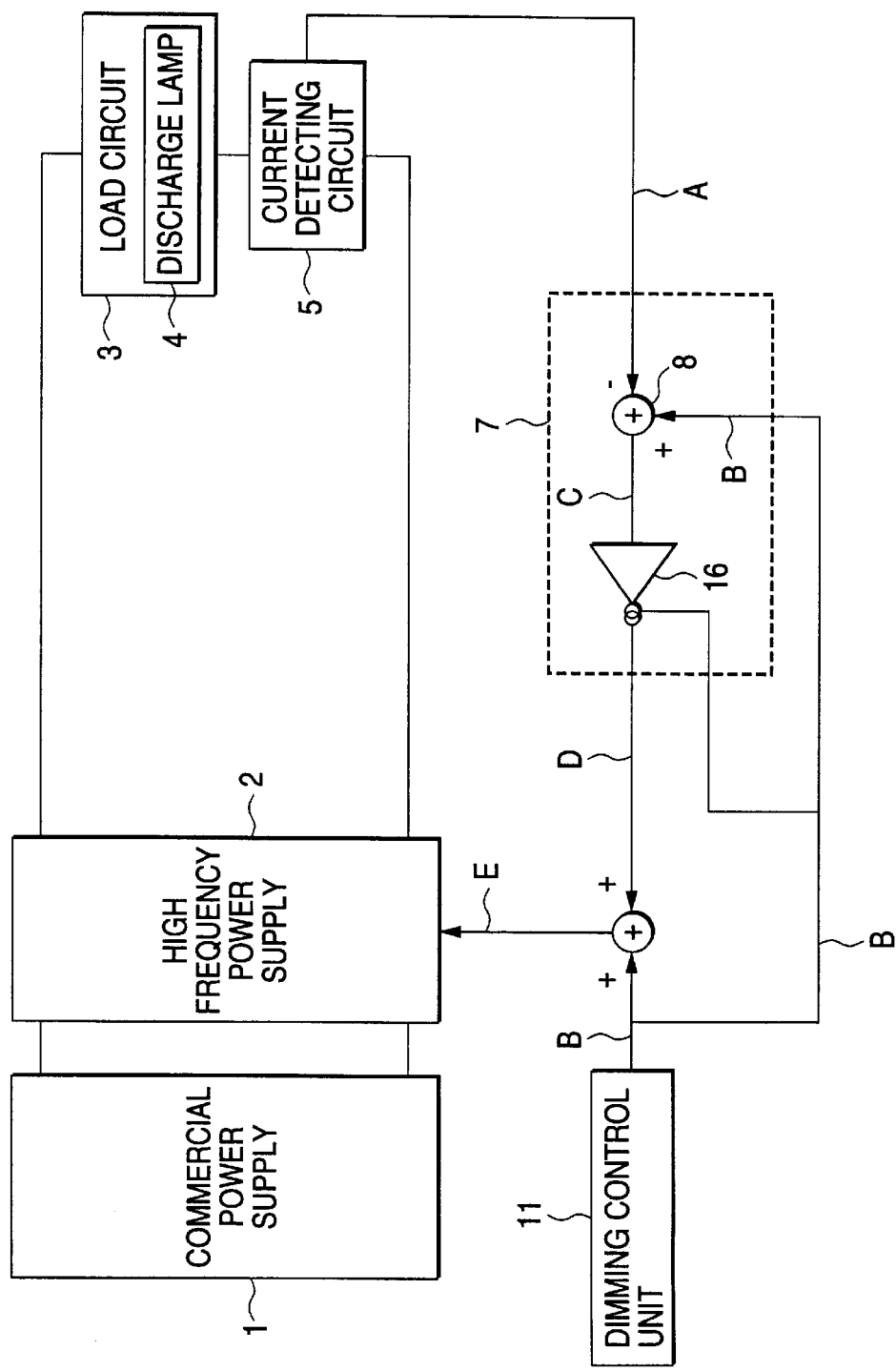
FIG. 15 is a structural diagram according to a fifth embodiment of the present invention.
Figure 16:
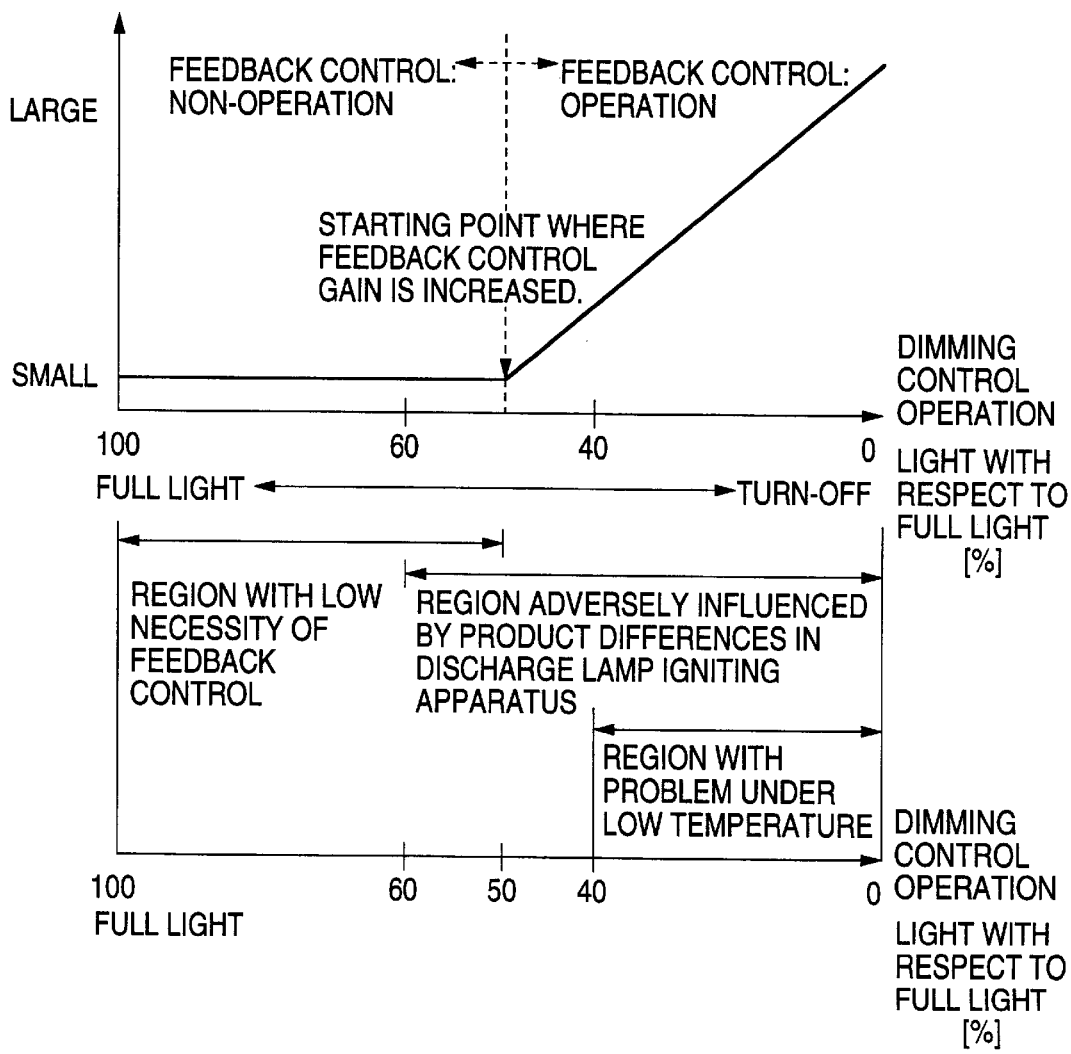
FIG. 16 is a diagram for explaining operation/non-operation of a feedback control according to the fifth embodiment of the present invention.

FIG. 15 indicates a structural diagram of a discharge lamp igniting apparatus according to this embodiment. In this drawing, reference numeral 16 is a variable error amplifying circuit whose amplification is variable with respect to an error signal C, and is arranged by, for example, the transconductance amplifier (known as "NJM 13600/13700" marketed by SHINNIHON MUSEN company). The variable error amplifying circuit 16 varies the amplification for the error signal C by detecting the voltage of the dimming control signal B. An upper side of FIG. 16 is a diagram for representing the amplification and the time instant when the variable error amplifying circuit 16 commences the feedback control. A lower portion of FIG. 16 is a diagram for explaining a characteristic operation related to the dimming control. Similar to the first embodiment, when the light level of the dimming control signal B becomes 50% for full light, the feedback control is started. When the light level of the dimming control signal B becomes lower (darker), the feedback control gain of the variable error amplifying circuit 16 is increased, whereas when the light level becomes higher (lighter), the feedback control gain is decreased.

In other words, the variable error amplifying circuit 16 gradually increases the feedback control gain in response to the dimming control circuit B at the time when the feedback control is started. When the light level of the dimming control signal becomes higher (light), the feedback control gain is gradually decreased in response to the dimming control signal B.

It should be noted that the variable error amplifying circuit 16 outputs a signal "D" produced by amplifying the error signal C to the second adder 12. When the subtraction result obtained by subtracting the lamp current signal A from the dimming control signal B by the subtracter 8 becomes 0, since the amplified signal "D" also becomes 0, the control signal outputted from the adder 12 to the high frequency power supply 2 becomes the dimming control signal B.

In accordance with this embodiment, the variable error amplifying circuit 16 turns ON/OFF the feedback control in response to the dimming control signal B, and does not perform the feedback control in the light level under which the feedback control is essentially required. As a result, the range of the lamp current to be detected can be narrowed, so that the dynamic range can be relatively widened and the detection precision of the lamp current can be increased, and also the noise resistibility can be improved. Furthermore, since the variable error amplifying circuit 16 gradually amplifying the feedback control gain in response to the magnitude of the dimming control signal B, the rapid change in the control signal E can be suppressed. Therefore, it is possible to avoid that the light output from the discharge lamp 4 is rapidly varied.

Also, since the variable error amplifying circuit 16 commences the feedback control when the light level of the dimming control signal is present in the range between approximately 40% and approximately 60% for the full light, even when the light level is made low under low temperature state, it is sufficiently possible to prevent the discharge lamp from disappearing, and also accept the product differences of the discharge lamp igniting apparatus. The discharge lamp igniting apparatus according to the embodiment 5 can be constituted by such a simple structure, as compared with that shown in FIG. 7.

(Sixth Embodiment)

Figure 17:
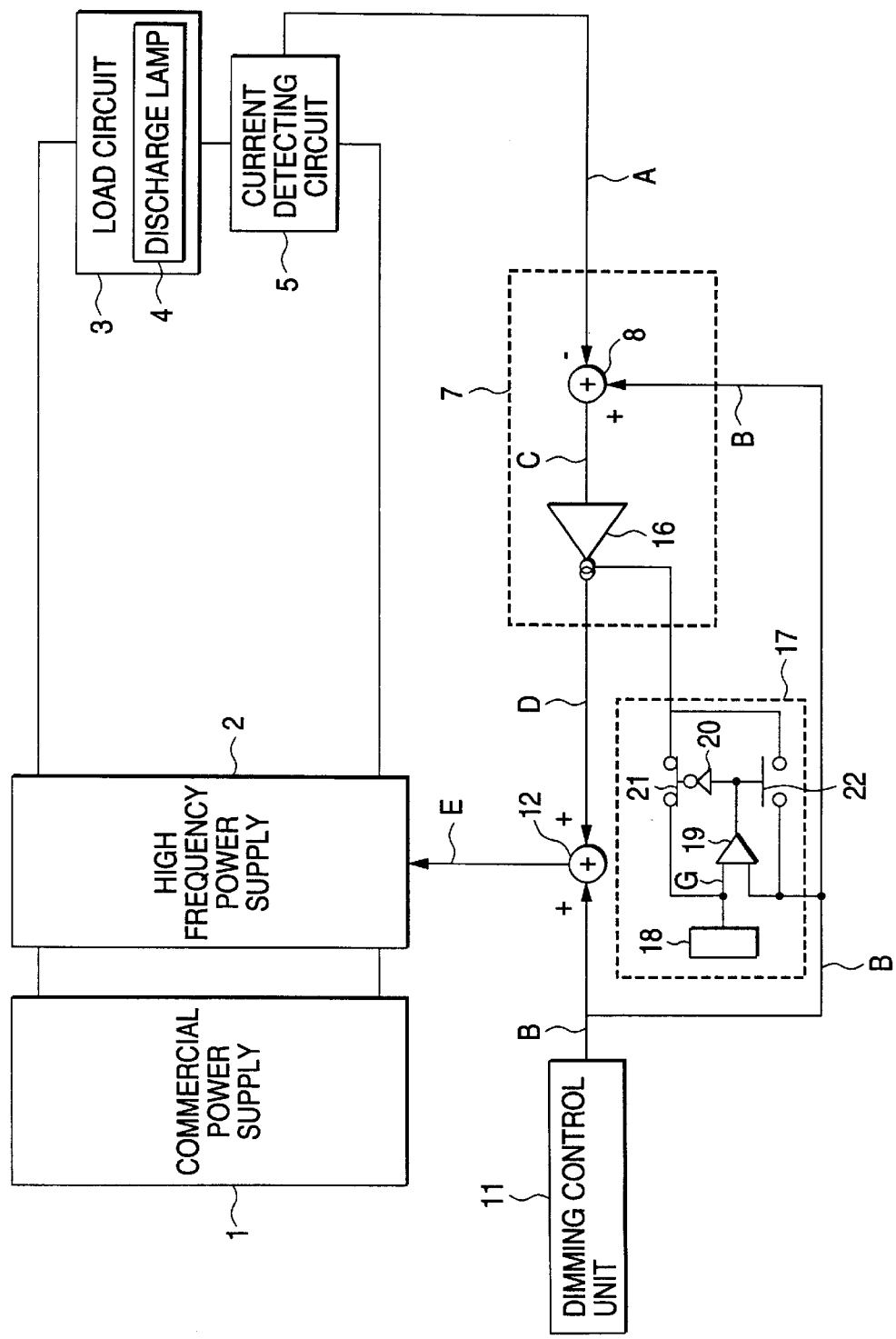
FIG. 17 is a structural diagram according to a sixth embodiment of the present invention.

FIG. 17 is a structural diagram for showing a discharge lamp igniting apparatus according to a sixth embodiment. Since the circuit arrangements other than a limiting circuit 17 are the same as those of the fifth embodiment, explanations thereof are omitted. The limiting circuit 17 controls the dimming control signal B inputted into the variable error amplifying circuit 16 in order to avoid that the discharge lamp 4 is oscillated by executing an excessive feedback control. In this drawing, reference numeral 18 is a limit value generating circuit for outputting a limit signal "G". This limit signal G is a signal for preventing the feedback control gain of the variable error amplifying circuit 16 from being higher than, or equal to a constant value. Reference numeral 19 indicates a comparator constructed of a comparator. The comparator 19 compares the limit signal G with the dimming control signal B to output a comparison signal by which an inverter 20 constructed of an inverter is inverted. Then, the inverter 20 causes any one of the switch 21 and the switch 22 to be selectively brought into the connection condition, so that any one of the dimming control signal B and the limit signal G is entered into the variable error amplifying circuit 16 of the feedback control circuit 7. It should be noted that FIG. 17 represents the following conditions. That is, the switch 21 side is brought into the connection condition by the inverter 20, so that the limit signal G is inputted into the variable error amplifying circuit 16, and the switch 22 side is brought into the non-connection condition.

As a result, in the case that the value of the dimming control signal B is smaller than the limit signal G, the inverter 20 brings the switch 22 into the connection condition, so that the dimming control signal B is entered into the variable error amplifying circuit 16. In the case that the value of the dimming control signal B is larger than the limit signal G, the inverter 20 is inverted by the output derived from the comparator 19, so that the switch 21 is brought into the connection condition, and the limit signal G is outputted to the variable error amplifying circuit 16. At the same time, the switch 22 is brought into the non-connection condition, so that the dimming control signal is not outputted to the variable error amplifying circuit 16. In this case, the limit signal G may have such a value that the unstable operations of the entire system such as oscillations can be prevented, because the feedback control gain of the variable error amplifying circuit 16 is excessively increased higher than, or equal to a preselected value. Also, when the light level becomes low (dark) and thus the value of the dimming control signal B becomes smaller than the limit signal G, the inverter is again inverted by receiving the comparison output from the comparator 19. Then, the switch 22 is brought into the connection condition, and the dimming control signal B is entered into the variable error amplifying circuit 16.

Figure 18:
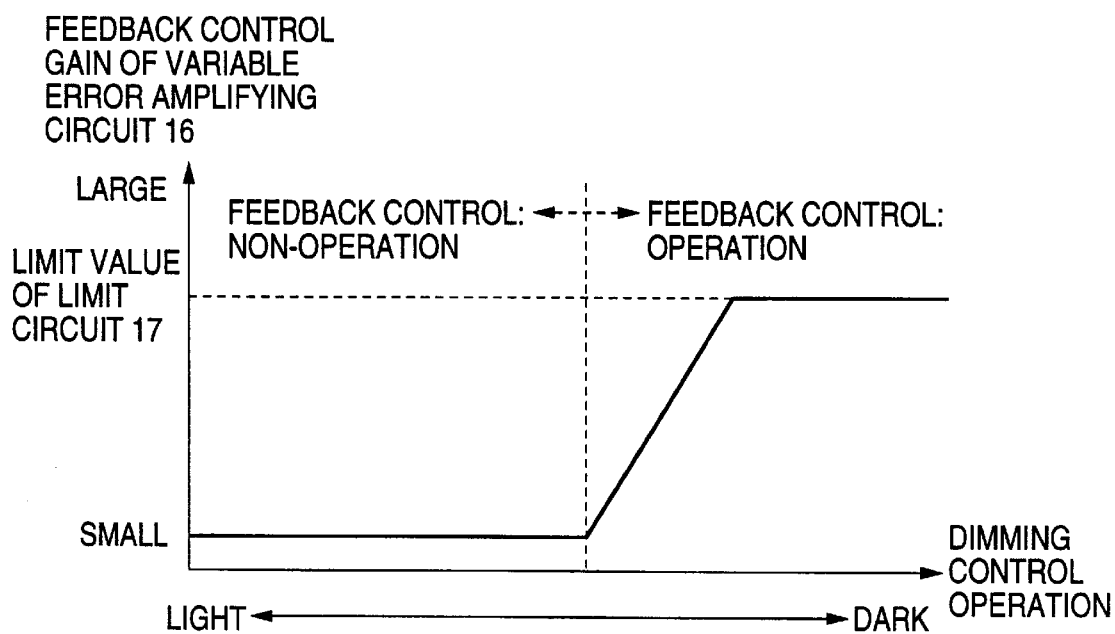
FIG. 18 is a diagram for explaining an upper limit of a feedback control gain according to the sixth embodiment of the present invention.

FIG. 18 shows a relationship diagram between the feedback control gain of the variable error amplifying circuit 16 and the dimming control signal B. The limit signal G is set with respect to the dimming control signal B, so that the upper limit of the feedback control gain is set.

In accordance with this embodiment, when the value of the dimming control signal B becomes larger than the limit signal G by comparing the dimming control signal B with the limit signal G, the limit circuit 17 limits that the feedback control gain of the variable error amplifying circuit 16 is continuously increased in response to the magnitude of the dimming control signal B. As a result, the limit circuit 17 can prevent the unstable operations of the entire system such as oscillations. Also, since the upper limit value is provided in the feedback control gain, the rate of change of the feedback control gain with respect to the dimming control signal B is relatively increased. Even when the change width of the dimming control signal B is narrowed, it is possible to avoid the extraordinary oscillations caused when the feedback gain is increased. It should be understood that the limit circuit 17 can prevent the feedback control gain of the variable error amplifying circuit 16 from being excessively increased in response to the limit signal G outputted from the limit value generating circuit 18. Alternatively, the limit value may be set to the variable error amplifying circuit 16 itself in order to avoid that the feedback control gain is extraordinarily increased.

(Seventh Embodiment)

Figure 19:
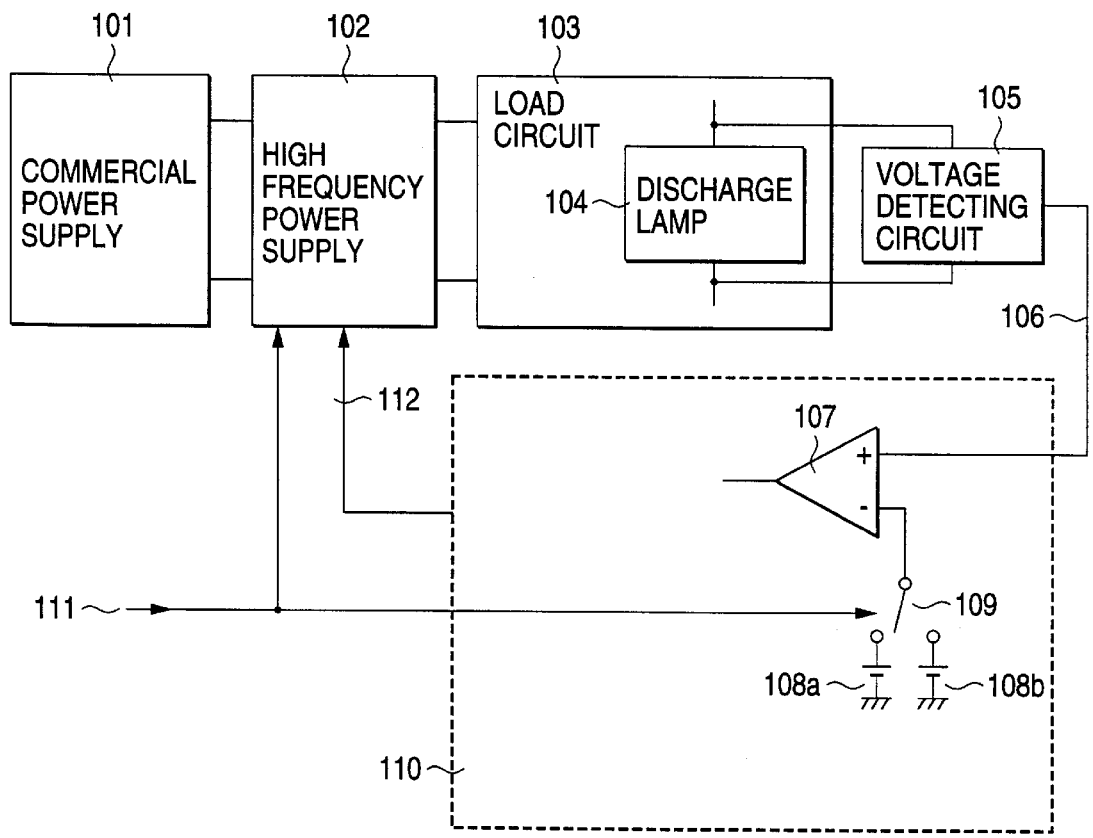
FIG. 19 is a structural diagram for representing a discharge lamp igniting apparatus according to a seventh embodiment of the present invention.

FIG. 19 is a diagram for explaining a discharge lamp igniting apparatus according to an embodiment of the present invention. In FIG. 19, reference numeral 101 shows a commercial power supply, reference numeral 102 represents a high frequency power supply, and reference numeral 103 denotes a load circuit containing a discharge lamp 104. Reference numeral 105 shows a voltage detecting circuit for detecting a voltage of the discharge lamp 104, reference numeral 106 is a detection voltage detected by the voltage detecting circuit 105, reference numeral 107 represents a comparator for comparing a first reference voltage 108a with the detection voltage 106, or the detection voltage 106 with a second reference voltage 108b, and reference numeral 109 shows a two-stage switching circuit for switching the first reference voltage 8a and the second reference voltage 108b. Reference numeral 110 indicates a control circuit for sending a control signal 112 to the high frequency power supply 102 in response to the output from the comparator 107, and reference numeral 111 represents a dimming control signal entered into the control circuit 110.

Referring now to FIG. 19, operations of the discharge lamp igniting apparatus according to the seventh embodiment will be explained. The voltage of the commercial power supply 101 is inputted into the high frequency power supply 102 to convert the voltage of the commercial frequency into a voltage of a high frequency. The voltage of the high frequency converted by the high frequency power supply 102 is controlled in response to an externally inputted dimming control signal 111, and then is entered into the load circuit 103. As a result, the discharge lamp 104 is turned ON, the voltage of the discharge lamp 104 is detected by the voltage detecting circuit 105, and then the detected voltage 106 is outputted from the voltage detecting circuit 105. These operations are similar to those of eighth to thirteenth embodiments which will be described later. Subsequently, the comparator 107 for constituting the control circuit 110 compares the detected voltage 106 outputted from the voltage detecting circuit 105 with the first reference voltage 108a which is switched by the two-stage switching circuit 109 in response to the dimming control signal 111, or compares the detected voltage 106 with the second reference voltage 108b which is switched by the two-stage switching circuit 109. Then, when the detection voltage 106 becomes high, the comparator 107 judges that it is the discharge lamp 104 in the final lifetime stage, and sends a control signal 112 to the high frequency power supply 102, by which the output of the high frequency power supply 102 is interrupted, or reduced.

Figure 20:
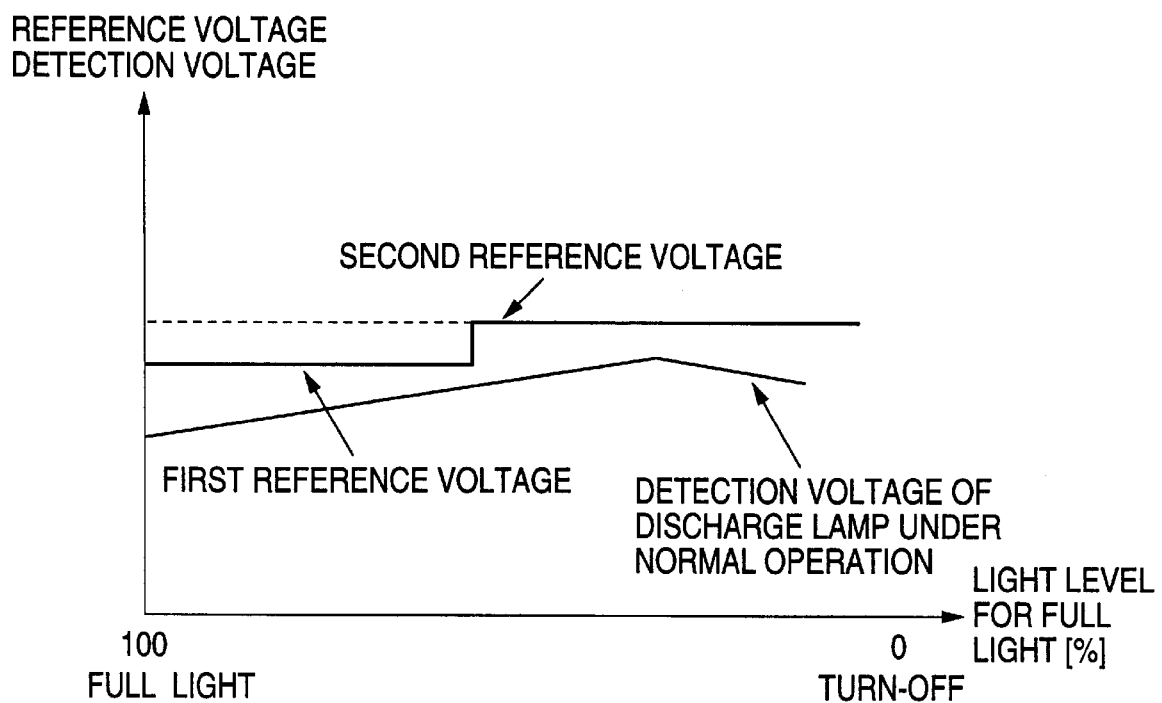
FIG. 20 is an example of an operation characteristic according to the seventh embodiment.

Then, operations of the discharge lamp igniting apparatus will now be explained with reference to a characteristic diagram shown in FIG. 20. FIG. 20 represents a relationship between a light level for full light and the detected voltage 106 of the discharge lamp 104 under normal condition, and another relationship between the light level for the full light and the reference voltage. When the light level with respect to the full light is smaller than, or equal to a predetermined value, the reference voltage to be set to the comparator 107 is switched by the two-stage switching circuit 109 from the first reference voltage 108a to the second reference voltage 108b, as shown in FIG. 20. It should be noted that the reference voltage has the necessary condition, i.e., the first reference voltage 108a<the second reference voltage 108b. Then, when the detected voltage 106 reaches either the first reference voltage 108a or the second reference voltage 108b, it is judged that the discharge lamp 104 is in the final lifetime stage. This may be also applied to the eighth embodiment. As a consequence, the comparator 107 can perform a correct judgment between the discharge lamp 104 under normal state and the discharge lamp 104 in the final lifetime stage over the entire range of the light level. As a consequence, the discharge lamp 104 can be properly used, and also it is possible to prevent the discharge lamp igniting apparatus from being destroyed.

(Eighth Embodiment)

Figure 21:
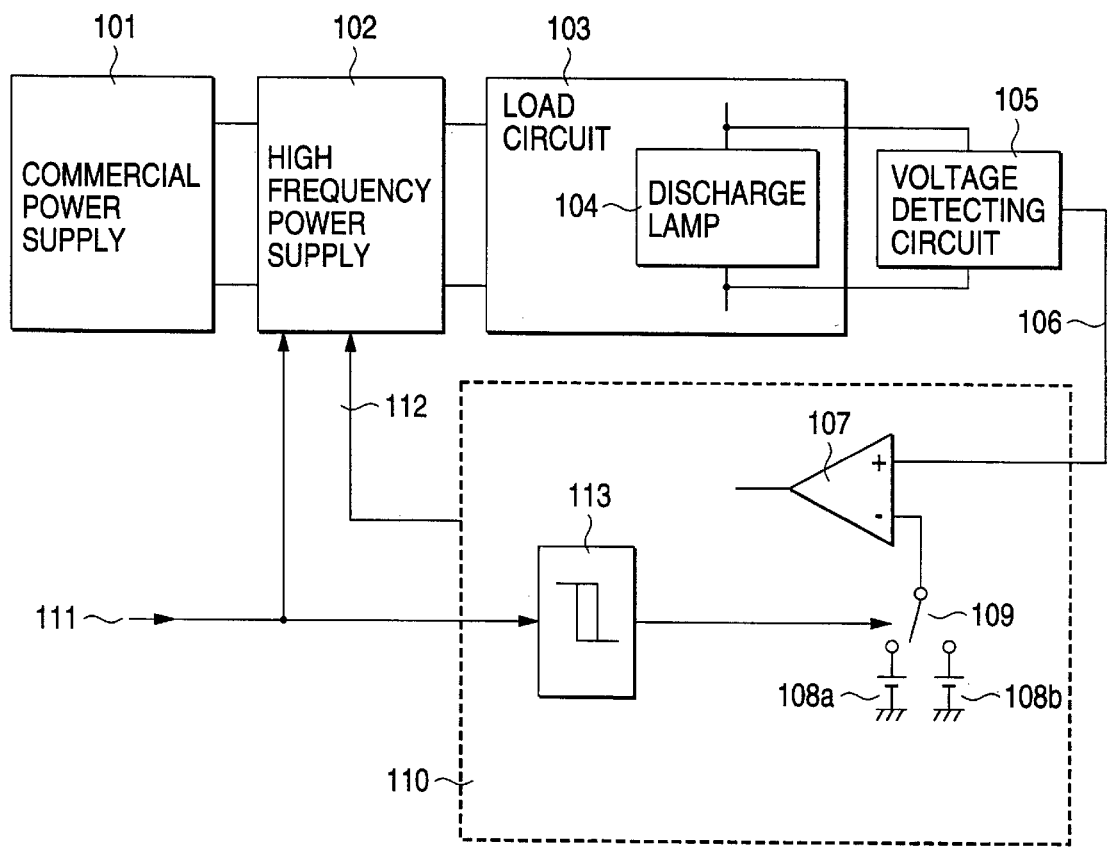
FIG. 21 is a structural diagram for showing an eighth embodiment.

FIG. 21 is a diagram for explaining a discharge lamp igniting apparatus according to an eighth embodiment of the present invention. In FIG. 21, reference numeral 113 shows a hysteresis circuit for establishing a hysteresis characteristic when the two-stage switching circuit 109 switches the first reference voltage 108a and the second reference voltage 108b. It should be noted that the same reference numerals employed in the seventh embodiment are used to indicate the same or similar circuit elements of this embodiment.

Referring now to FIG. 21, operations of the discharge lamp igniting apparatus according to the eighth embodiment will be described. A dimming control signal 111 is entered into the hysteresis circuit 113 so as to establish hysteresis characteristics at a point where the reference voltage is switched from the first reference voltage 108a to the second reference voltage 108b by the two-stage switching circuit 109 in response to the dimming control signal 111, and at another point where the reference voltage is switched from the second reference voltage 106b into the first reference voltage 108a. Next, the comparator 107 for constituting the control circuit 110 compares the detected voltage 106 outputted from the voltage detecting circuit 105 with the first reference voltage 108a, or compares the detected voltage 106 with the second reference voltage 108b. Then, when the detected voltage 106 becomes high, the comparator 107 judges that it is the discharge lamp 104 in the final lifetime stage, and sends a control signal 112 to the high frequency power supply 102, by which the output of the high frequency power supply 102 is interrupted, or reduced.

Figure 22:
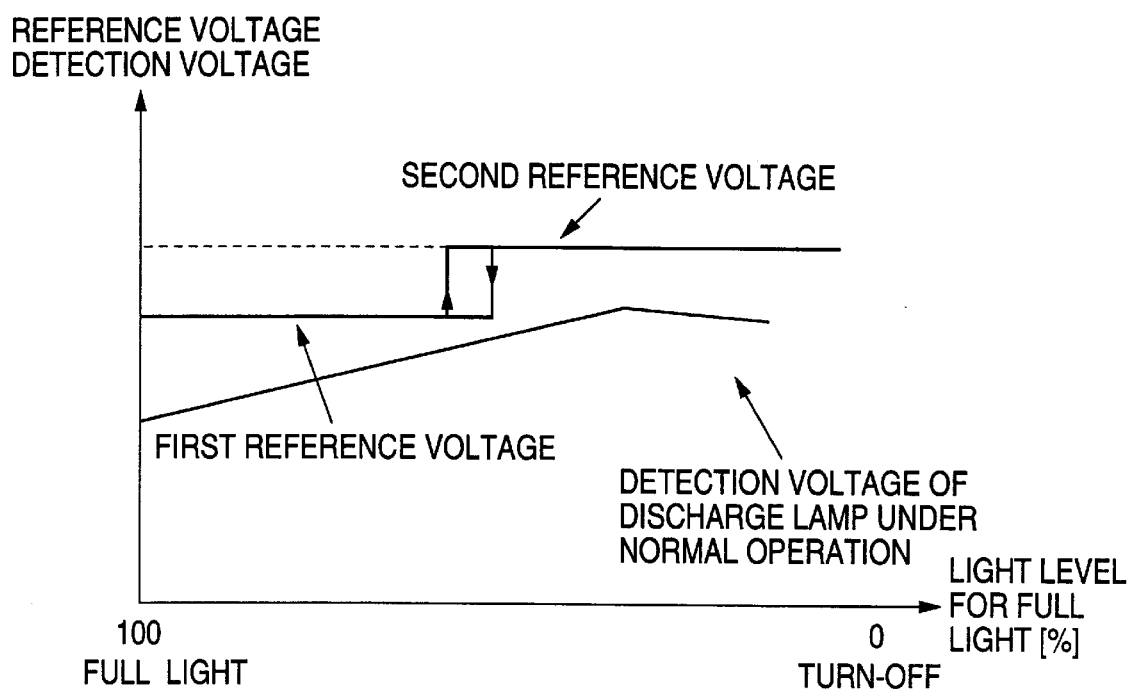
FIG. 22 is an example of an operation characteristic according to the eighth embodiment.

Then, operations of the discharge lamp igniting apparatus will now be explained with reference to a characteristic diagram shown in FIG. 22. FIG. 22 represents a relationship between a light level with respect to full light and the detection voltage 106 of the discharge lamp 104 under normal condition, and another relationship between the light level for the full light and the reference voltage. When the light level for the full light is smaller than, or equal to a predetermined value, the hysteresis characteristics are established by the two-stage switching circuit 109 and the hysteresis circuit 113 at the point where the reference voltage to be set to the comparator 107 is switched from the first reference voltage 108a to the second reference voltage 108b, and at the point where the reference voltage is changed from the second reference voltage to the first reference voltage, as indicated in FIG. 22. As a result, the first reference voltage 8a and the second reference voltage 108b are stably switched by the two-stage switching circuit 109. Also, it is possible to prevent the two-stage switching circuit 109 from being very sensitively reacted in response to the externally supplied noise. As a consequence, the comparator 107 can perform a correct judgment between the discharge lamp 104 under normal state and the discharge lamp 104 in the final lifetime stage over the entire range of the light level. As a consequence, the discharge lamp 104 can be properly used, and also it is possible to prevent the discharge lamp igniting apparatus from being destroyed.

(Ninth Embodiment)

Figure 23:
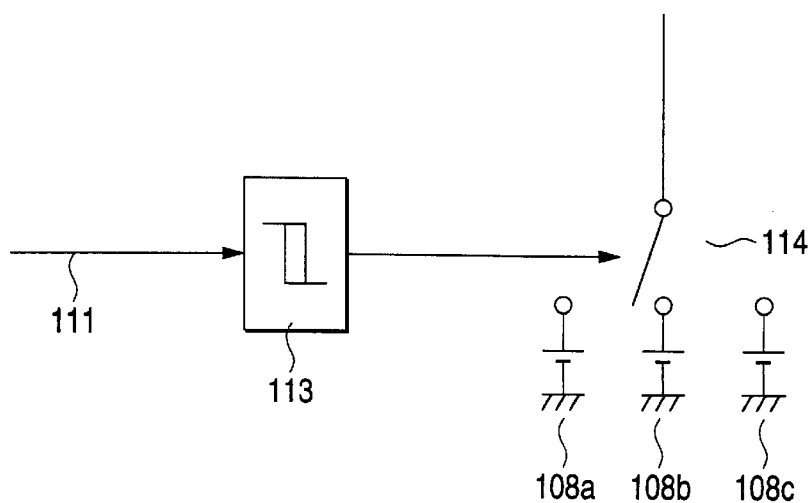
FIG. 23 is a structural diagram for representing a ninth embodiment.

FIG. 23 is a diagram for explaining a discharge lamp igniting apparatus according to a further embodiment of the present invention. In FIG. 23, reference numeral 114 denotes a three-stage switching circuit for switching the first reference voltage 108a, the second reference voltage 108b, and a third reference voltage 108c. It should be noted that the same reference numerals shown in the seventh and eighth embodiments will be employed as those for denoting the same or similar circuit elements in the ninth embodiment.

Operations of the discharge lamp igniting apparatus according to the ninth embodiment will now be described with reference to FIG. 23. The dimming control signal 111 is inputted into the hysteresis circuit 113, and a hysteresis characteristic is established at a point where the reference voltage is switched from the first reference voltage 108a to the second reference voltage 108b by the three-stage switching circuit 114 and further from the second reference voltage 108b to the third reference voltage 108c in response to the dimming control signal 111, and another point where the reference voltage is switched from the third reference voltage 108c to the second reference voltage 108b, and further from the second reference voltage 108b to the first reference voltage 108a. Next, the comparator 107 for constituting the control circuit 110 compares the detected voltage 106 outputted from the voltage detecting circuit 105 with the first reference voltage 108a, or the detected voltage 106 with the second reference voltage 108b, or the detected voltage 106 with the third reference voltage 108c. Then, when the detected voltage 106 becomes high, the comparator 107 judges that it is the discharge lamp 104 in the final lifetime stage, and sends a control signal 112 to the high frequency power supply 102, by which the output of the high frequency power supply 102 is interrupted, or reduced.

Figure 24:
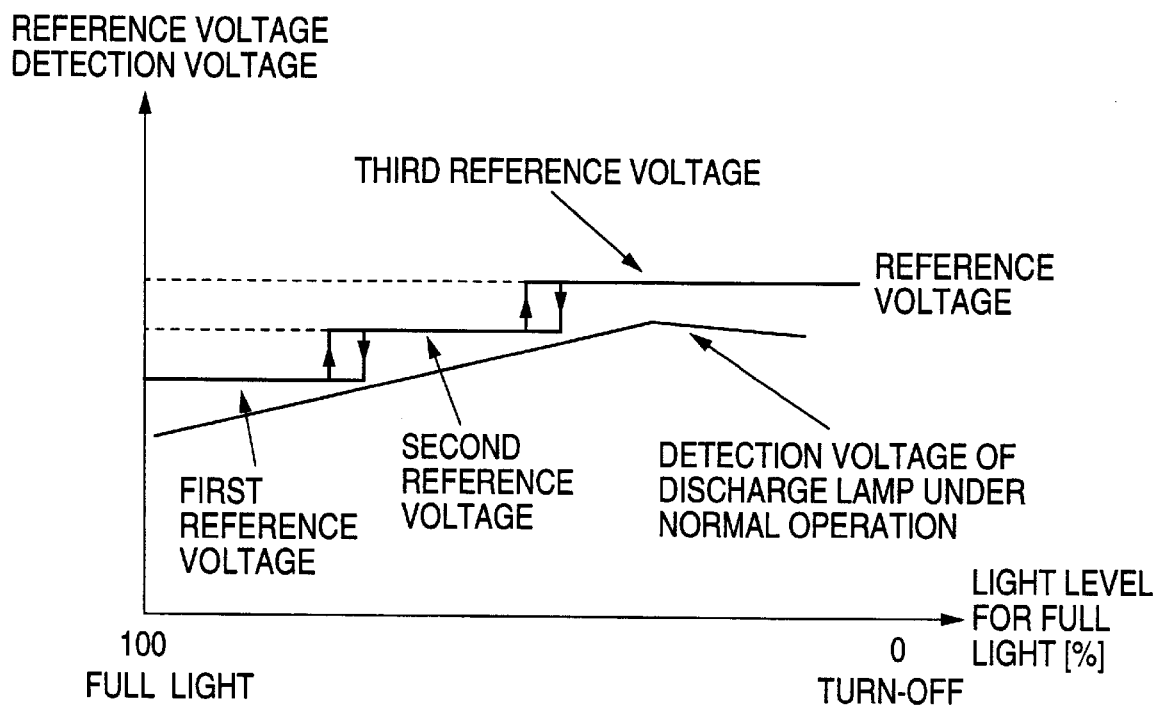
FIG. 24 is an example of an operation characteristic according to the ninth embodiment.

Then, operations of the discharge lamp igniting apparatus will now be explained with reference to a characteristic diagram shown in FIG. 24. FIG. 24 represents a relationship between a light level for full light and the detection voltage 106 of the discharge lamp 104 under normal condition, and another relationship between the light level for the full light and the reference voltage. When the light level for the full light is smaller than, or equal to a predetermined value, the hysteresis characteristics are established by the three-stage switching circuit 114 and the hysteresis circuit 114 at the point where the reference voltage to be set to the comparator 107 is switched from the first reference voltage 108a to the second reference voltage 108b and further from the second reference voltage 108b to the third reference voltage 108c, and at the point where the reference voltage is changed from the second reference voltage to the first reference voltage, as indicated in FIG. 24, and further from the second reference voltage 108b to the first reference voltage 108a. It should be noted that the reference voltage has the necessary condition, i.e., the first reference voltage 108a<the second reference voltage 108b<the third reference voltage 108c. Then, when the detected voltage 106 reaches the first reference voltage 108a or the second reference voltage 108b, or the third reference voltage 108c, it is judged that the discharge lamp 104 is in the final lifetime stage. Accordingly, the first reference voltage 108a, the second reference voltage 108b, and the third reference voltage 108c are stably switched by the three-stage switching circuit 114, and furthermore, it is possible to prevent the three-stage switching circuit 114 from being very sensitively reacted in response to the externally supplied noise. Also, the comparator 107 can perform such a correct judgment between the discharge lamp 104 under normal state and the discharge lamp 104 in the final lifetime stage over the entire range of the light level. As a consequence, the discharge lamp 104 can be properly used, and also it is possible to prevent the discharge lamp igniting apparatus from being destroyed.

(Tenth Embodiment)

Figure 25:
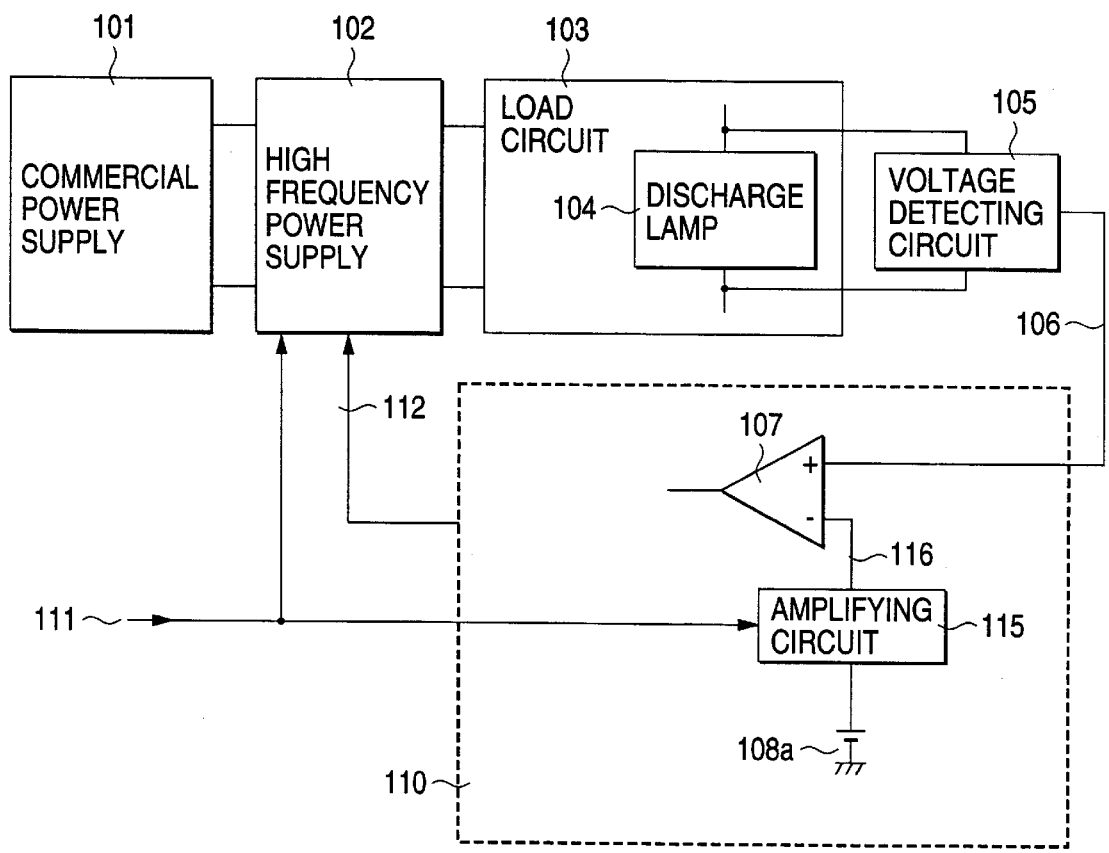
FIG. 25 is a structural diagram for showing a tenth embodiment.

FIG. 25 is a diagram for explaining a discharge lamp igniting apparatus according to a further embodiment of the present invention. In FIG. 25, reference numeral 115 shows an amplifying circuit for amplifying the reference voltage 108a, and reference numeral 116 indicates an amplified voltage outputted from the amplifying circuit 115. It should be noted that the same reference numerals shown in the seventh to ninth embodiments are employed as those for indicating the same or similar circuit elements of the tenth embodiment.

Referring now to FIG. 25, a description will be made of a discharge lamp igniting apparatus according to the tenth embodiment. The dimming control signal 111 is inputted into the amplifying circuit 115, and the first reference voltage 108a is gradually amplified in response to the dimming control signal 111. The comparator 107 for constituting the control circuit 110 compares the detected voltage 106 with the amplified voltage 116 outputted from the amplifying circuit 115. Then, when the detected voltage becomes high, the comparator 107 judges that the discharge lamp 104 is in the final lifetime stage, and thus the control circuit 110 sends out to the high frequency power supply 102, such a control signal 112 for interrupting, or reducing the output of the high frequency power supply 102 by way of the control circuit 110.

Figure 26:
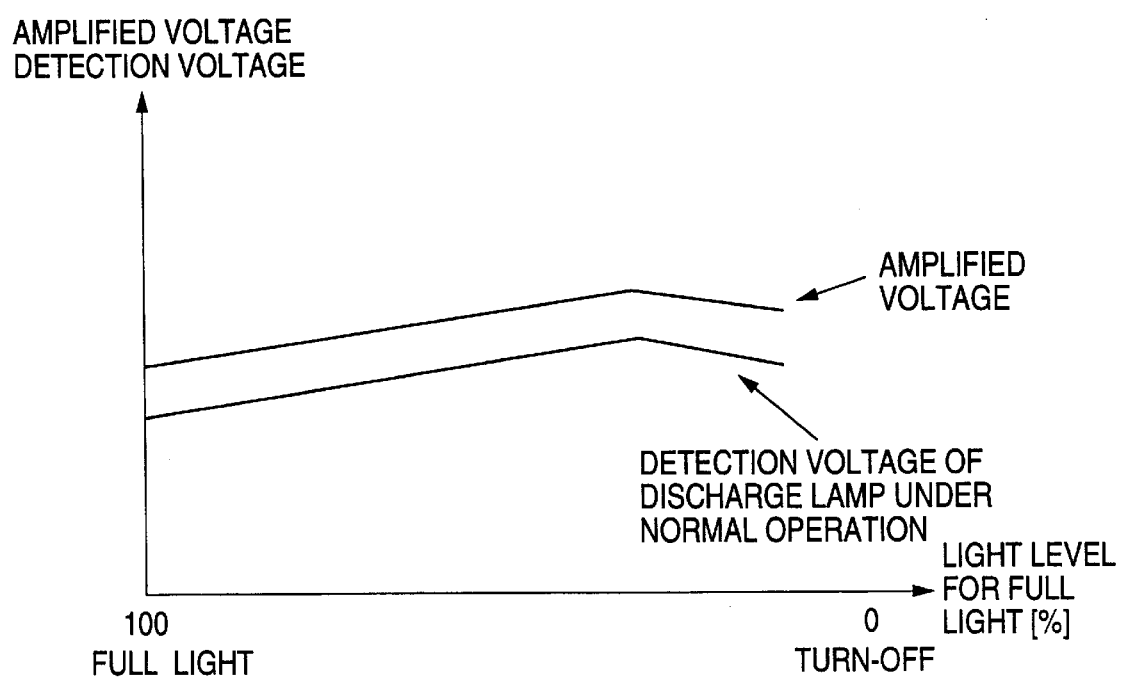
FIG. 26 is an example of an operation characteristic according to the tenth embodiment.

Also, the operations of the discharge lamp igniting apparatus will now be explained with employing a characteristic diagram shown in FIG. 26. FIG. 26 represents a relationship between a light level for the full light and the detected voltage 106 of the discharge lamp 104 operated under normal condition, and further another relationship between the light level for the full light and the amplified reference voltage. In connection with the changes from 100% to 0% in the light level for the full light, as indicated in FIG. 26, the reference voltage is gradually amplified in the amplifying circuit 115. Then, when the detected voltage 106 reaches the amplified voltage 116, it is so judged that the discharge lamp 104 is in the final lifetime period. Accordingly, the comparator 104 can correctly discriminate the discharge lamp 104 operated under normal condition from the discharge lamp 104 operated in the final lifetime stage over the entire region of the light level. As a consequence, the discharge lamp 104 can be used in the proper manner, and further it is possible to prevent the discharge lamp igniting apparatus from being electrically destroyed in advance.

(Eleventh Embodiment)

Figure 27:
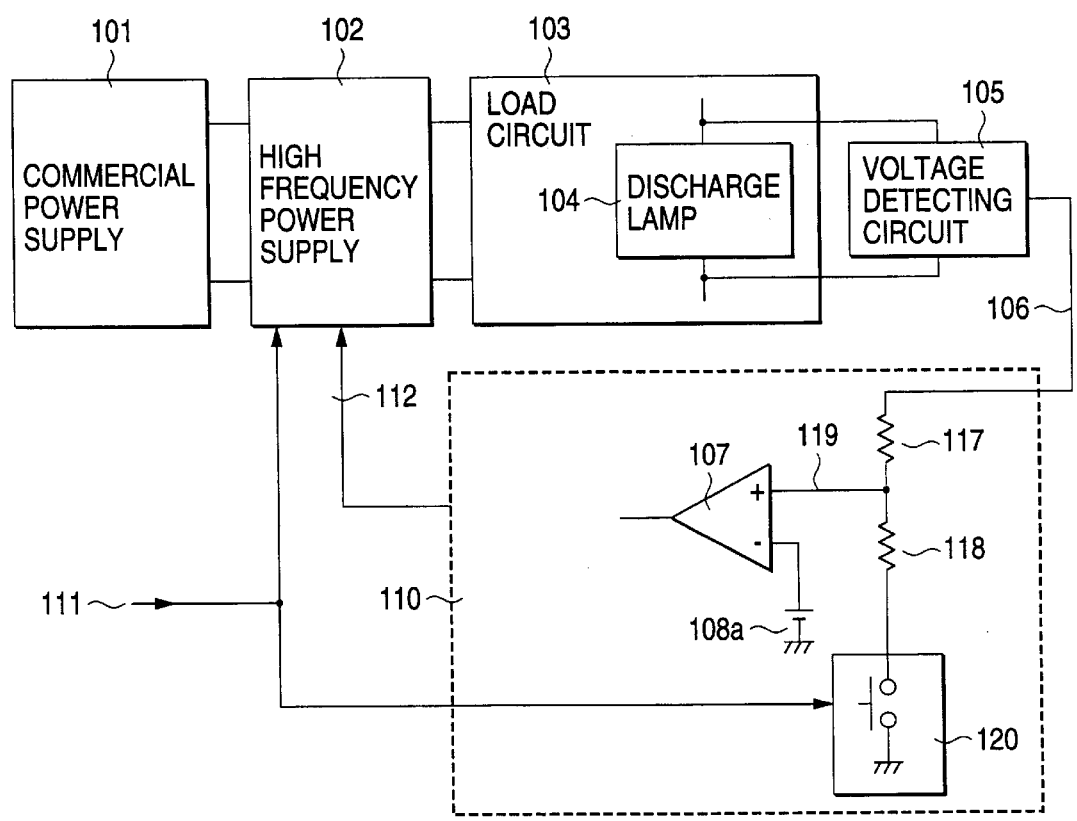
FIG. 27 is a structural diagram for representing an eleventh embodiment.

FIG. 27 is a diagram for explaining a discharge lamp igniting apparatus according to a further embodiment of the present invention. In FIG. 27, reference numeral 119 shows a divided voltage obtained by dividing the reference voltage based on a first resistor 117 and a second resistor 118, and reference numeral 120 denotes a switch circuit operated in response to the dimming control signal 111. It should be noted that the same reference numerals shown in the seventh to tenth embodiments are employed as those for indicating the same or similar circuit elements of the eleventh embodiment.

Referring now to FIG. 27, a description will be made of a discharge lamp igniting apparatus according to the eleventh embodiment. The dimming control signal 111 is inputted into the switch circuit 120, and when the light level is larger than, or equal to an arbitrarily set value, the switch circuit 120 is stopped, so that the detected voltage 106 is inputted into the comparator 107. Also, when the light level is smaller than, or equal to the arbitrarily set value, the switch circuit 120 is actuated. As a result, the detected voltage 106 is divided by the first resistor 117 and the second resistor 118, so that the divided voltage 119 is inputted into the comparator 107. The comparator 107 compares the detection voltage 106 with the first reference voltage 108a, or the divided voltage 119 with the first reference voltage 108a. Then, when the detected voltage becomes high, the comparator 107 judges that the discharge lamp 104 is in the final lifetime stage, and thus the control circuit 110 sends out to the high frequency power supply 2, such a control signal 112 for interrupting, or reducing the output of the high frequency power supply 102 by way of the control circuit 110.

Figure 28:
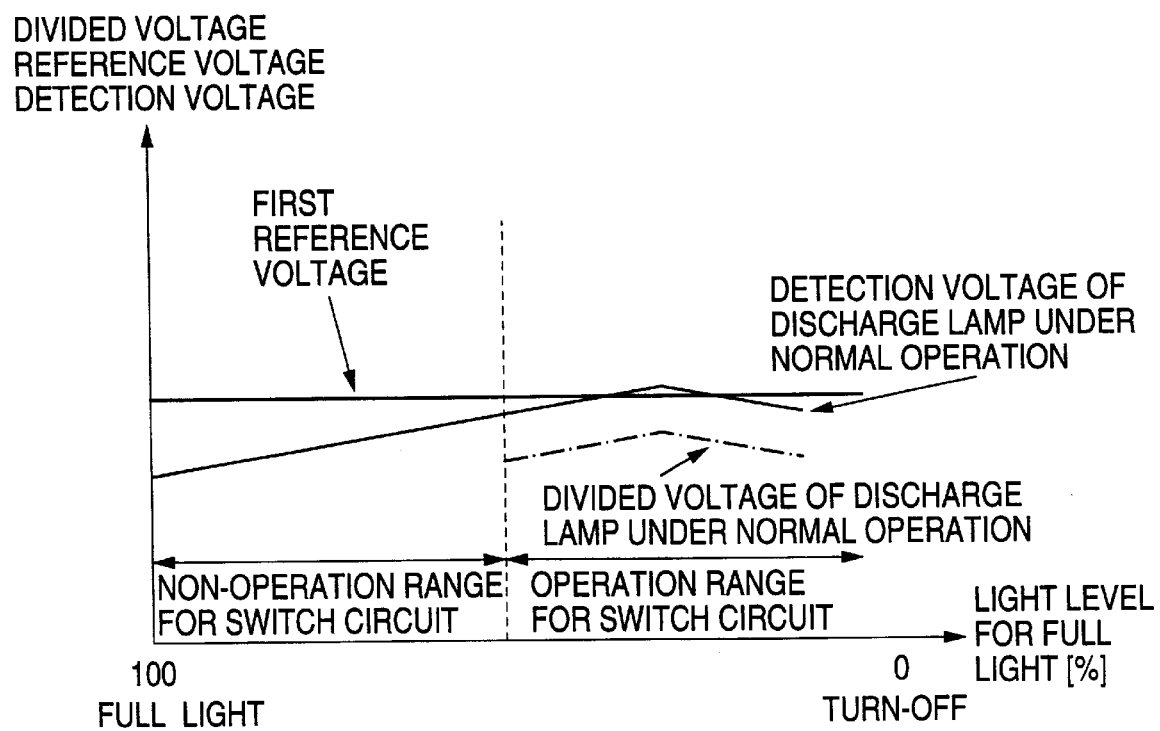
FIG. 28 is an example of an operation characteristics according to the eleventh embodiment.

Also, the operations of the discharge lamp igniting apparatus will now be explained with employing a characteristic diagram shown in FIG. 28. FIG. 28 represents a relationship between a light level for the full light and the detected voltage 106 of the discharge lamp 104 operated under normal condition, and further another relationship between the light level for the full light and the divided voltage. When the light level for the full light is larger than, or equal to a predetermined value, namely in a range where the switch circuit 120 is not operable, the detected voltage 106 of the discharge lamp 104 operated under normal condition is produced, as shown in FIG. 28. To the contrary, when the light level is smaller than, or equal to a predetermined value, namely, in a range where the switch circuit 120 is operable, since the detected voltage of the discharge lamp 104 operated under normal condition is subdivided, this detected voltage is decreased. Then, when the detected voltage 106, or the divided voltage 119 reaches the first reference voltage 118a, it is so judged that the discharge lamp 104 is in the final lifetime period. Accordingly, the comparator 104 can correctly discriminate the discharge lamp 104 operated under normal condition from the discharge lamp 104 operated in the final lifetime stage over the entire region of the light level. As a consequence, the discharge lamp 104 can be used in the proper manner, and further it is possible to prevent the discharge lamp igniting apparatus from being electrically destroyed in advance.

(Twelfth Embodiment)

Figure 29:
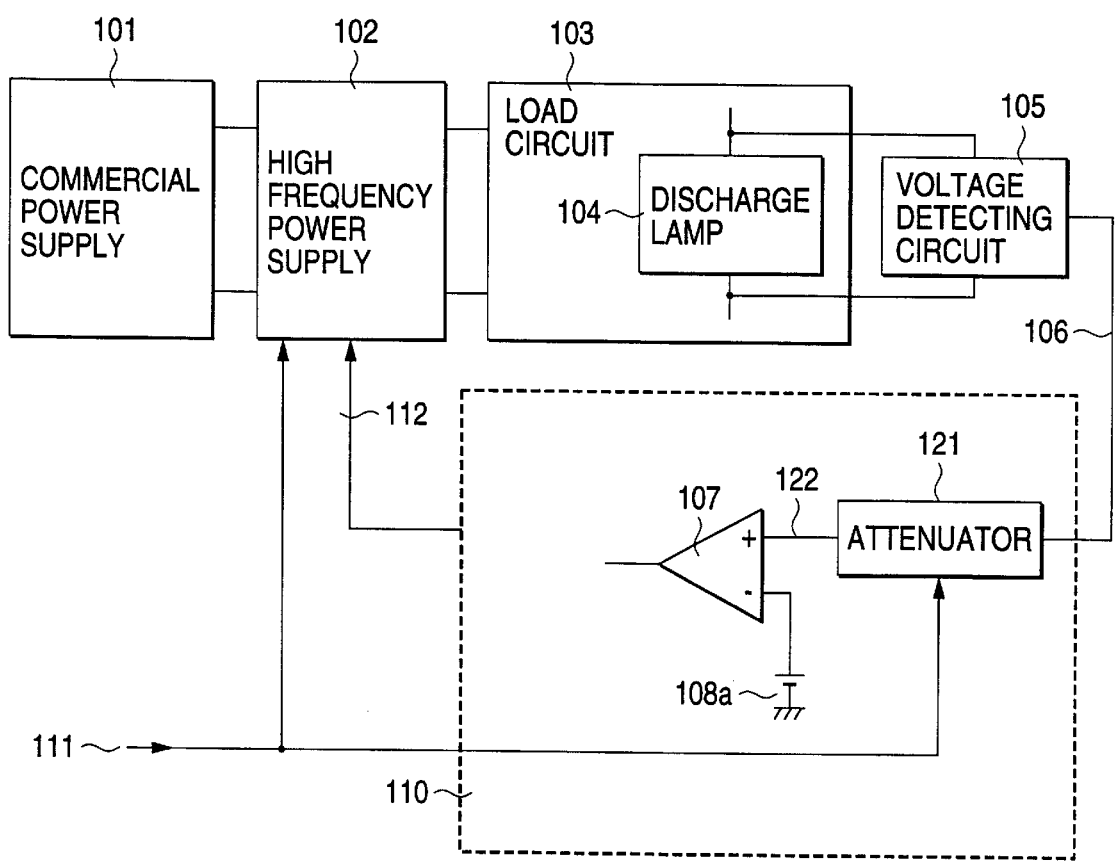
FIG. 29 is a structural diagram for showing a twelfth embodiment.

FIG. 29 is a diagram for explaining a discharge lamp igniting apparatus according to a further embodiment of the present invention. In FIG. 29, reference numeral 121 shows an attenuator for attenuating the detection voltage 106, and reference numeral 122 indicates an-attenuated voltage attenuated by the attenuator 121. It should be noted that the same reference numerals shown in the seventh to eleventh embodiments are employed as those for indicating the same or similar circuit elements of the twelfth embodiment.

Referring now to FIG. 29, a description will be made of a discharge lamp igniting apparatus according to the twelfth embodiment. The dimming control signal 111 is inputted into the attenuator 121, and the detected voltage 106 is gradually attenuated in response to the decrease of the light level. The comparator 107 compares the reference voltage 108a with the attenuated voltage 122 attenuated by the attenuator 121. Then, when the attenuated voltage 122 becomes high, the comparator 107 judges that the discharge lamp 104 is in the final lifetime stage, and thus the control circuit 110 sends out to the high frequency power supply 102, a control signal 112 for interrupting, or reducing the output of the high frequency power supply 102 by way of the control circuit 110.

Figure 30:
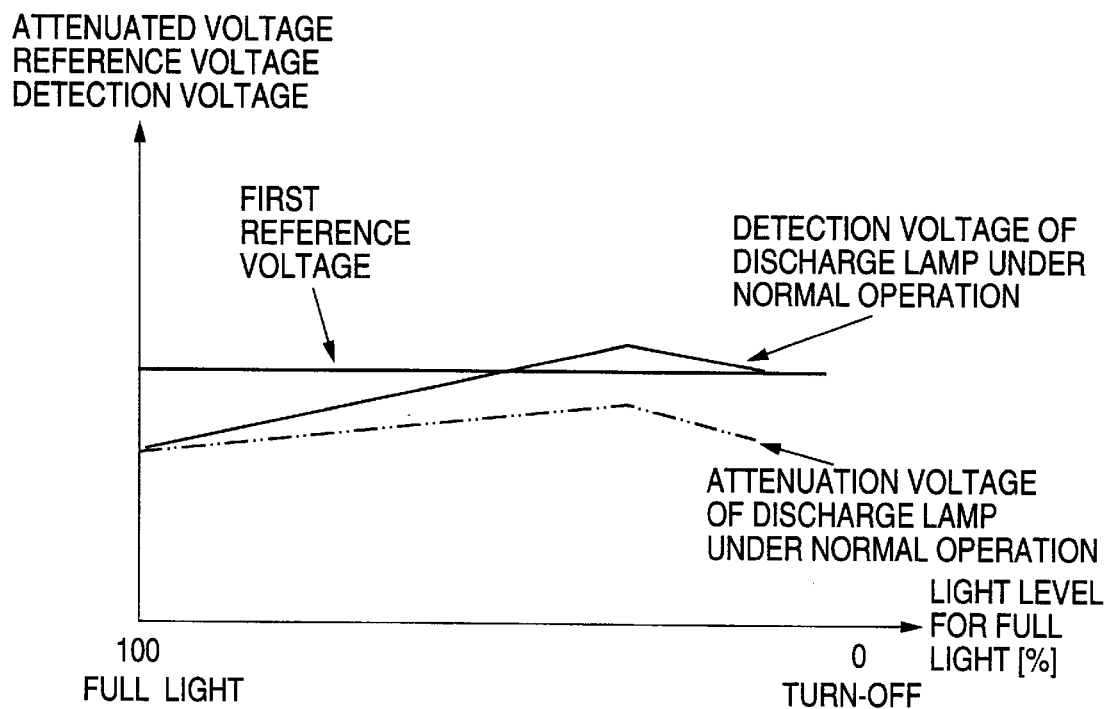
FIG. 30 is an example of an operation characteristic according to the twelfth embodiment.

Also, the operations of the discharge lamp igniting apparatus will now be explained with employing a characteristic diagram shown in FIG. 30. FIG. 30 represents a relationship between a light level for the full light and the detection voltage 106 of the discharge lamp 104 operated under normal condition, and further another relationship between the light level for the full light and the attenuated voltage produced by attenuating the detected voltage 6 of the discharge lamp 104 operated under normal condition. In-connection with the changes from 100% to 0% in the light level for the full light, as indicated in FIG. 30, the detected voltage 106 of the discharge lamp 104 operated under normal condition is gradually attenuated by the attenuator 121. Then, when the attenuated voltage 122 reaches the first reference voltage 108a, it is judged that the discharge lamp 104 is in the final lifetime period. Accordingly, the comparator 104 can correctly discriminate the discharge lamp 104 operated under normal condition from the discharge lamp 104 operated in the final lifetime stage over the entire region of the light level. As a consequence, the discharge lamp 104 can be used in the proper manner, and further it is possible to prevent the discharge lamp igniting apparatus from being electrically destroyed in advance.

(Thirteenth Embodiment)

Figure 31:
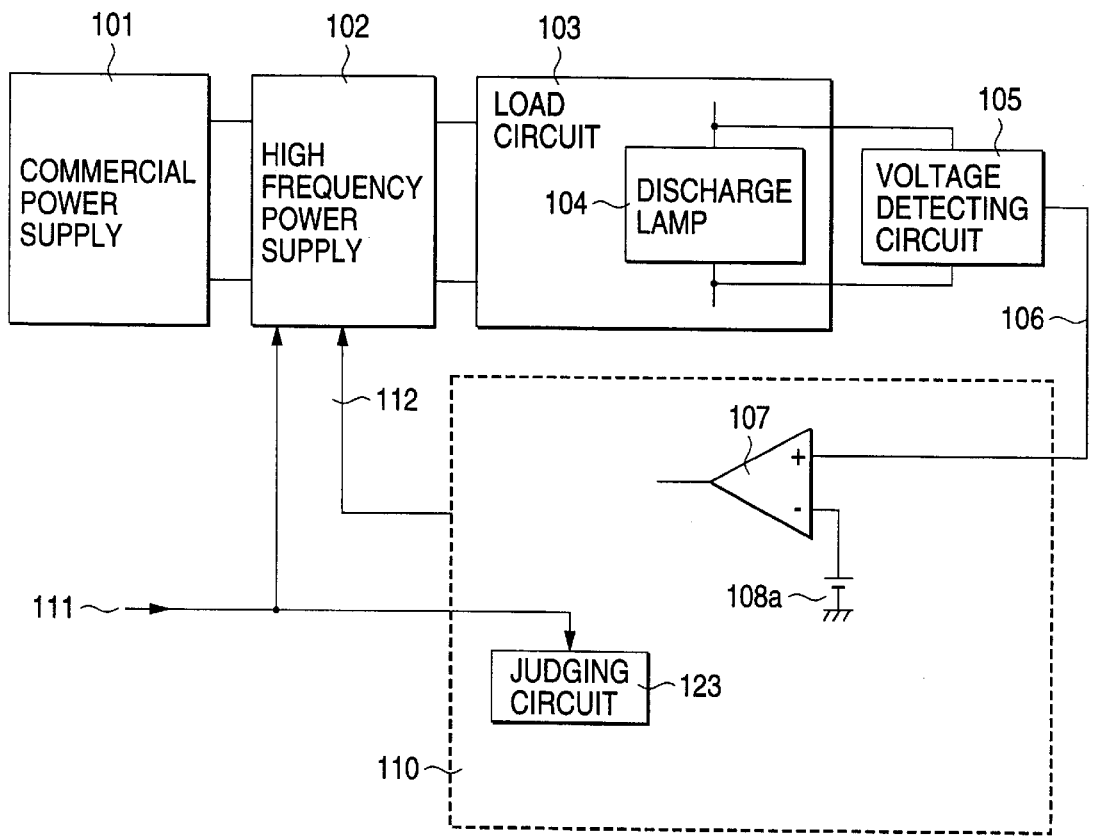
FIG. 31 is a structural diagram for representing a thirteenth embodiment.

FIG. 31 is a diagram for explaining a discharge lamp igniting apparatus according to a further embodiment of the present invention. In FIG. 31, reference numeral 123 indicates a judging circuit for judging whether or not the control signal 112 is sent to the high frequency power supply 102 in response to the dimming control signal 111. It should be noted that the same reference numerals shown in the seventh to twelfth embodiments are employed as those for indicating the same or similar circuit elements of the thirteenth embodiment.

Referring now to FIG. 31, a description will be made of a discharge lamp igniting apparatus according to the thirteenth embodiment. The dimming control signal 111 is inputted into the judging circuit 123, and when the light level of the discharge lamp 104 is larger than, or equal to a set value, and further the comparator 107 judges that the discharge lamp 104 is in the final lifetime period, the judging circuit 123 causes the control circuit 110 to send out the control signal 112 to the high frequency power supply 102, so that the output of the high frequency power supply 102 is interrupted, or reduced. In the case that the light level is smaller than, or equal to a predetermined value, even when the comparator 107 judges that the discharge lamp 104 is in the final lifetime period, the judging circuit 123 causes the control circuit 110 to send out the control signal 112 to the high frequency power supply 102.

Figure 32:
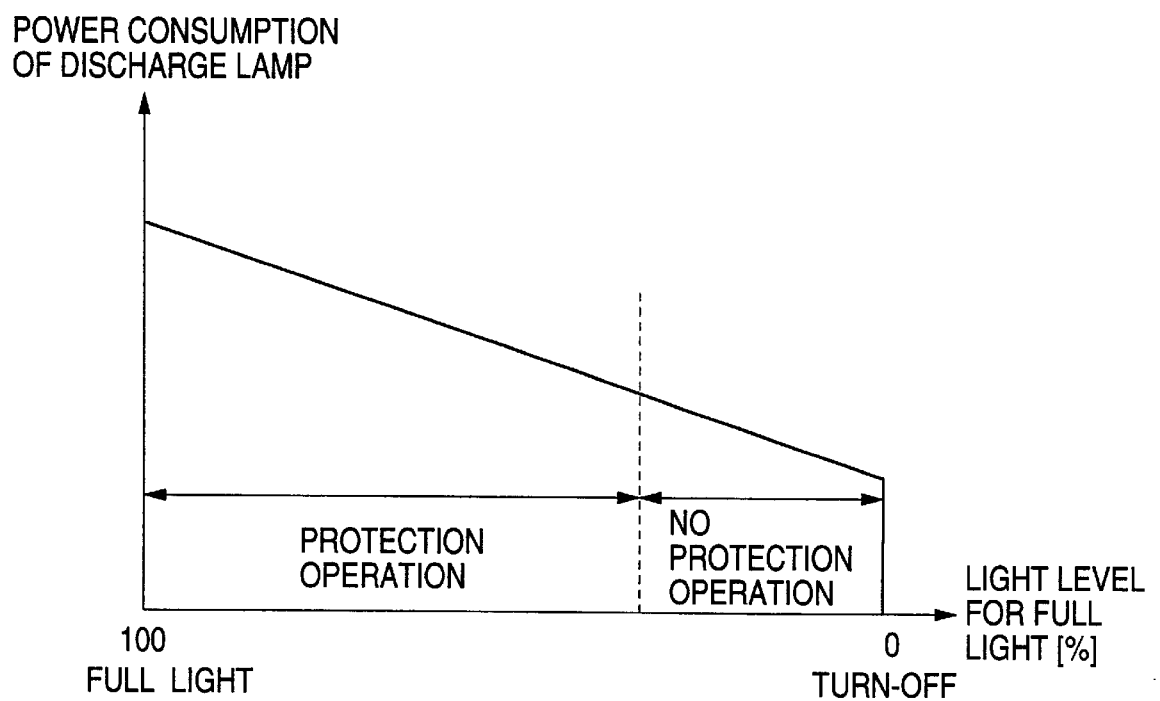
FIG. 32 is an example of an operation characteristic according to the thirteenth embodiment.

Also, the operations of the discharge lamp igniting apparatus will now be explained with employing a characteristic diagram shown in FIG. 32. FIG. 32 represents a relationship between a light level for the full light and power consumption of the discharge lamp 104. When the light level for the full light is larger than, or equal to a predetermined value, if the discharge lamp 104 is in the final lifetime period, then such a protection operation for interrupting, or reducing the output of the high frequency power supply 102 is carried out by the judging circuit 123. However, when the light level is smaller than, or equal to a predetermined value, if the discharge lamp 104 is in the final lifetime period, then a protection operation for interrupting, or reducing the output of the high frequency power supply 102 is stopped by the judging circuit 123. This may constitute an idea. That is, when the light level is low, even if the discharge lamp 104 is in the final lifetime period and thus a DC current will flow through the high frequency power supply 102, the power consumption is reduced. As a result, substantially no load is given to the high frequency power supply 102. Accordingly, even when an arrangement is employed in the comparator 107 in which the first reference voltage 108a is set to a low value, and therefore the final lifetime period of the discharge lamp 104 is high sensitively judged, there is no erroneous judgment that when the light level is low, the discharge lamp 104 operated under normal operation is recognized as the discharge lamp 104 operated in the final lifetime stage. Thus, the discharge lamp 104 can be properly used.

As was described above, the present invention can obtain the following advantages.

In accordance with the first aspect of the present invention, in the discharge lamp igniting apparatus for detecting the lamp current signal flowing through the discharge lamp to perform the feedback control, when said dimming control signal reaches a preset value, entering of the signal amplified by said error amplifying circuit into said high frequency power supply is blocked. Accordingly, the lamp current signal is detected only in the more limited range, and the dynamic range of the actually required detecting range can be relatively widened. There are effects that the detected precision can be increased and the noise resistibility can be improved.

In accordance with the second aspect of the present invention, when a light level of said dimming control signal is located within a range of the light level between approximately 40% and approximately 100%, or between approximately 60% and approximately 100% for full light, entering of the signal amplified by the error amplifying circuit into the high frequency power supply is blocked. In other words, when the light level reaches 40% to 60%, entering of the signal amplified by the error amplifying circuit into the high frequency power supply is started to be blocked. Since the range where the useless feedback control is eliminated can be increased, there are effects that the dynamic range of the lamp current signal within the necessary detecting range can be further widened, and moreover, the product differences in the discharge lamp igniting apparatus and the flickers of the discharge lamps caused by this product difference can be prevented.

In accordance with the third aspect of the present invention, plural pieces of said load circuits are connected to the high frequency power supply, and plural pieces of said current detecting circuits are connected to the high frequency power supply; and the lamp current signals outputted from the respective current detecting circuits are compared with each other, whereby a small one of the compared lamp signals is outputted to a subtracter. Thus, the feedback control is carried out on the basis of the lamp current signal of the discharge lamp which may easily disappear. There is such an effect that the dimming control operations of the plural discharge lamps can be performed under stable conditions.

In accordance with the fourth aspect of the present invention, plural pieces of said load circuits are connected in parallel to said high frequency power supply, and plural pieces of said current detecting circuits are connected in parallel to said high frequency power supply; and each of said load circuits and each of said current detecting circuits are connected through a balancer transformer. There is an advantage that the dimming control operation of the plural discharge lamps can be performed under stable condition.

In accordance with the fifth aspect of the present invention, a temperature detecting circuit for detecting an ambient temperature is provided; and when the temperature detected by said temperature detecting circuit is lower than, or equal to a predetermined value, the value of the lamp current signal is reduced and then the reduced lamp current signal is outputted to a subtracter. Accordingly, the feedback control is carried out on the basis of the value lower than the actually detected value, and the compensation for the light level can be made large only under low temperature. Therefore, there is an effect that the stability of the dimming control under low temperature can be increased. In accordance with the sixth aspect of the present invention, said discharge lamp igniting apparatus includes a sequence control circuit for sequentially controlling at least turn-on/turn-off operations of the discharge lamp; and when said discharge lamp is under turn-off state, said sequence control circuit blocks entering of the control signal into the high frequency power supply. As a result, when the discharge lamp is not turned ON, the control signal for the feedback control is not inputted into the high frequency power supply. There is an effect that the erroneous operation when the discharge lamp is turned OFF can be avoided.

In accordance with the seventh aspect of the present invention, when the discharge lamp is in the turn-off state, said sequence control circuit replaces the control signal by a sequence control signal corresponding to the turn-off state and inputs said sequence control signal into the high frequency power supply. As a result, the changes in the currents flowing through the discharge lamps when the sequence is changed from the turn-ON to the turn-OFF state can be small, while erroneous operation during the operation can be prevented. Thus, there is an effect that the rapid light emission can be avoided.

In accordance with the eighth aspect of the present invention, when said dimming control signal reaches a preset value, said error amplifying circuit sets the output signal thereof to 0. As a consequence, there is an advantage that when the feedback control is stopped based on the light level, it is possible to realize stopping of this feedback control in a simple structure.

In accordance with the ninth aspect of the present invention, said error amplifying circuit is such a variable error amplifying circuit that when the light level of the dimming control signal becomes lower and darker, a feedback control gain is increased, whereas when the light level becomes higher and lighter, the feedback control gain is decreased. Therefore, since the variable error amplifying circuit gradually amplifies the feedback control gain in response to the magnitude of the dimming control signal, the rapid change of the control signal can be suppressed. As a result, such an effect can be achieved while preventing the rapid change in the light output of the discharge lamp.

In accordance with the tenth aspect of the present invention, said discharge lamp igniting apparatus includes a limiting circuit for limiting the magnitude of the feedback control gain from becoming larger than, or equal to a predetermined value. Accordingly, the limit circuit limits the operations in which the dimming control signal is increased, and thus the feedback control gate is continuously increased. Therefore, there is an effect that the unstable operation of the entire system such as the oscillation can be prevented.

The discharge lamp igniting apparatus according to the eleventh aspect of the invention includes: voltage detecting means for detecting a voltage of the discharge lamp; voltage changing means for changing either the voltage of the discharge lamp detected by this voltage detecting means or a reference voltage in response to a light level of the discharge lamp; comparing means for comparing the reference voltage with the voltage of the discharge lamp changed by this voltage changing means; and control means for interrupting, or reducing the output of the high frequency power supply when the voltage of the discharge lamp becomes high. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the twelfth aspect of the invention, the control means employed in the eleventh aspect of the invention includes two-stage switching means for switching a first reference voltage and a second reference voltage when the light level of the discharge lamp is lower than, or equal to a predetermined value; the comparing means compares the voltage of the discharge lamp with the first reference voltage, or the voltage of the discharge lamp with the second reference voltage; and when the voltage of the discharge lamp becomes high, the output of the high frequency power supply is interrupted, or reduced. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the thirteenth aspect of the invention, the control means employed in the eleventh aspect of the invention includes two-stage switching means for switching a first reference voltage and a second reference voltage when the light level of the discharge lamp is lower than, or equal to a predetermined value; the comparing means compares the voltage of the discharge lamp with the first reference voltage, or the voltage of the discharge lamp with the second reference voltage; and when the voltage of the discharge lamp becomes high, the output of the high frequency power supply is interrupted, or reduced. The first reference voltage and the second reference voltage are switched under stable condition. Further, it is possible to prevent the two-stage switching circuit from being very sensitively reacted in response to the externally supplied noise. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the fourteenth aspect of the invention, the control means employed in the eleventh aspect of the invention includes hysteresis means for establishing a hysteresis characteristic at a point where when the light level of the discharge lamp is smaller than, or equal to a predetermined value, plural-stage switching means switches the voltage from the first reference voltage into the second reference voltage and further from the second reference voltage into a third reference voltage; and at another point where the plural-stage switching means switches the voltage from the third reference voltage to the second reference voltage and further from the second reference voltage to the first reference voltage; and the comparing means compares the voltage of the discharge lamp with the first reference voltage, or the voltage of the discharge lamp with the second reference voltage, or the voltage of the discharge lamp with the third reference voltage; and when the voltage of the discharge lamp becomes high, the output of the high frequency power supply is interrupted, or reduced. The first reference voltage, the second reference voltage and the third reference voltage are switched under stable condition. Further, it is possible to prevent the plural-stage switching circuit from being very sensitively reacted in response to the externally supplied noise. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the fifteenth aspect of the invention, the control means employed in the eleventh aspect of the invention includes voltage amplifying means for gradually amplifying the reference voltage in connection with the decrease of the light level of the discharge lamp; the comparing means compares the voltage of the discharge lamp with the voltage amplified by the voltage amplifying means; and when the voltage of the discharge lamp becomes high, the output of the high frequency power supply is interrupted, or reduced. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the sixteenth aspect of the invention, the control means employed in the eleventh aspect of the invention includes voltage dividing means for dividing the voltage of the discharge lamp when the light level of the discharge lamp is smaller than, or equal to a predetermined value; the comparing means compares the voltage of the discharge lamp with the reference voltage, or the voltage divided by the voltage dividing means with the reference voltage; and when the voltage of the discharge lamp, or the voltage divided by the voltage dividing means becomes high, the output of the high frequency power supply is interrupted, or reduced. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the seventeenth aspect of invention, the voltage control means employed in the eleventh aspect of the invention includes voltage attenuating means for gradually attenuating the voltage of the discharge lamp in connection with the decrease of the light level of the discharge lamp; the comparing means compares the reference voltage with the voltage attenuated by the voltage attenuating means; and when the voltage attenuated by the voltage attenuating means become high, the output of the high frequency power supply is interrupted, or reduced. Accordingly, it is possible to more correctly discriminate the discharge lamp operated under normal condition from the discharge lamp operated in the final lifetime stage over the entire range of the light level. As a consequence, there are such effects that the discharge lamp can be used in the proper manner, and further the electrical destruction of the discharge lamp igniting apparatus can be avoided in advance.

In the discharge lamp igniting apparatus according to the eighteenth aspect of the invention, the control means employed in the eleventh aspect of the invention causes the comparing means to compare the voltage of the discharge lamp with the reference voltage when the light level of the discharge lamp is larger than, or equal to a predetermined value, and either interrupts or reduces the output of the high frequency power supply when the voltage of the discharge lamp becomes high. There is no such an erroneous judgment that when the light level is low, the discharge lamp operated under normal condition is judged as the discharge lamp operated in the final lifetime period. As a consequence, there is an effect that the discharge lamp can be utilized in a proper manner.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A discharge lamp igniting apparatus, comprising:
    a load circuit containing a discharge lamp;
    a high frequency power supply for supplying high frequency power whose frequency is higher than that of a commercial power supply to the load circuit;
    a current detecting circuit for detecting a lamp current flowing through said discharge lamp to thereby output a lamp current signal;
    a dimming control circuit for controlling said high frequency power supply to thereby output a dimming control signal used to control the light of said discharge lamp;
    an error amplifying circuit for amplifying an error between said lamp current signal and said dimming control signal; and
    an adder for adding the signal amplified by said error amplifying circuit to said dimming control signal to thereby output the added signal as a control signal to said high frequency power supply; wherein:
    when said dimming control signal reaches a preset value, entering of the signal amplified by said error amplifying circuit into said high frequency power supply is blocked.

2. A discharge lamp igniting apparatus as claimed in claim 1 wherein:
    when a light level of said dimming control signal is set within a range of the light level between approximately 40% and approximately 100%, or between approximately 60% and approximately 100% for full light, entering of the signal amplified by the error amplifying circuit into the high frequency power supply is blocked.

3. A discharge lamp igniting apparatus as claimed in claim 1 wherein:

plural pieces of said load circuits are connected with the high frequency power supply, and plural pieces of said current detecting circuits are connected with the high frequency power supply; and the lamp current signals outputted from the respective current detecting circuits are compared with each other, whereby a smaller one of the compared lamp signals is outputted to a subtracter.

4. A discharge lamp igniting apparatus as claimed in claim 1 wherein:

plural pieces of said load circuits are connected in parallel to said high frequency power supply, and plural pieces of said current detecting circuits are connected in parallel to said high frequency power supply; and each of said load circuits and each of said current detecting circuits are connected through a balancer transformer.

5. A discharge lamp igniting apparatus as claimed in claim 1 wherein:

a temperature detecting circuit for detecting an ambient temperature is connected; and when the temperature detected by said temperature detecting circuit is lower than, or equal to a predetermined value, the value of the lamp current signal is reduced and then the reduced lamp current signal is outputted to a subtracter.

6. A discharge lamp igniting apparatus as claimed in claim 1 wherein:

said discharge lamp igniting apparatus includes a sequence control circuit for sequentially controlling at least turn-on/turn-off operations of the discharge lamp; and when said discharge lamp is under turn-off state, said sequence control circuit blocks entering of the control signal into the high frequency power supply.

7. A discharge lamp-igniting apparatus as claimed in claim 6 wherein:

when the discharge lamp is under turn-off state, said sequence control circuit replaces the control signal by a sequence control signal corresponding to the turn-off state and inputs said sequence control signal into the high frequency power supply.

8. A discharge lamp igniting apparatus as claimed in claim 1 wherein:

when said dimming control signal reaches a preset value, said error amplifying circuit sets the output signal thereof to 0.

9. A discharge lamp igniting apparatus as claimed in claim 8 wherein:

said error amplifying circuit is such a variable error amplifying circuit that when the light level becomes lower (darker), a feedback control gain is increased, and when the light level becomes higher (lighter), the feedback control gain is decreased.

10. A discharge lamp igniting apparatus as claimed in claim 8, wherein:

said discharge lamp igniting apparatus includes a limiting circuit for limiting the magnitude of the feedback control gain from becoming larger than, or equal to a predetermined value.

* * * * *